United States Patent
Raskin

(10) Patent No.: US 9,529,505 B2
(45) Date of Patent: *Dec. 27, 2016

(54) INDICATING POTENTIAL FOCUS IN A USER INTERFACE

(71) Applicant: Google Inc., Mountain View, CA (US)

(72) Inventor: Jef Raskin, Pacifica, CA (US)

(73) Assignee: Google Inc., Mountain View, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 13/939,118

(22) Filed: Jul. 10, 2013

(65) Prior Publication Data

US 2013/0298059 A1    Nov. 7, 2013

Related U.S. Application Data

(63) Continuation of application No. 13/037,295, filed on Feb. 28, 2011, now Pat. No. 8,510,668, which is a continuation of application No. 11/064,621, filed on Feb. 23, 2005, now abandoned, which is a continuation of application No. 09/827,336, filed on Apr. 3, 2001, now abandoned.

(60) Provisional application No. 60/194,210, filed on Apr. 3, 2000, provisional application No. 60/194,228, filed on Apr. 3, 2000, provisional application No. 60/194,226, filed on Apr. 3, 2000, provisional application No. 60/194,225, filed on Apr. 3, 2000, provisional application No. 60/194,351, filed on Apr. 3, 2000, provisional application No. 60/194,224, filed on Apr. 3, 2000, provisional application No. 60/194,342, filed on Apr. 3, 2000.

(51) Int. Cl.
| | | |
|---|---|---|
| G06F 3/048 | (2013.01) | |
| G06F 3/0484 | (2013.01) | |
| G06F 3/038 | (2013.01) | |
| G06F 9/44 | (2006.01) | |

(52) U.S. Cl.
CPC ............ G06F 3/0484 (2013.01); G06F 3/038 (2013.01); G06F 9/4443 (2013.01); *G06F 2203/0381* (2013.01)

(58) Field of Classification Search
CPC ...... G06F 3/0482; G06F 3/0481; G06F 3/048; G06F 3/04812
See application file for complete search history.

(56) References Cited

U.S. PATENT DOCUMENTS 5,673,401 A * 9/1997 Volk .................... G06F 3/04847
                                           348/E5.103
6,381,507 B1 * 4/2002 Shima ................ G05B 19/0426
                                           700/83

* cited by examiner

Primary Examiner — Tadeese Hailu
(74) Attorney, Agent, or Firm — Troutman Sanders LLP; James E. Schutz; Daniel M. Terhune

(57) ABSTRACT

Methods and apparatus, including computer program products, implementing and using techniques for an integrated user interface an interface that receives user input through the user interface. Output is provided through the user interface, and all user input received through the user interface is interpreted as explicitly being separated input into one of three classes, namely, pointing input, content input, and command input.

20 Claims, 12 Drawing Sheets

INDICATING POTENTIAL FOCUS IN A USER INTERFACE

CROSS-REFERENCE TO RELATED APPLICATIONS

This application is a continuation, and claims the benefit of priority under 35 U.S.C. §120, of U.S. patent application Ser. No. 11/064,621, entitled "Indicating Potential Focus In A User Interface" filed Feb. 23, 2005, which claims the benefit of priority under 35 U.S.C. §120 of U.S. patent application Ser. No. 09/827,336 entitled "Providing Commands Based On Selections Of Content In User Interface" filed Apr. 3, 2001, which claims priority under 35 U.S.C. §119(e) to the following U.S. patent application No. 60/194,210 entitled "Integrated User Interface Operating System"; application No. 60/194,228 entitled "Transparent User Interface Element"; application No. 60/194,226 entitled "User Interface With Stackable Selections"; application No. 60/194,225 entitled "Indicating Potential Focus in a User Interface"; application No. 60/194,351 entitled "User Interface with Universal Command Execution"; application No. 60/194,224 entitled "Circular Expanding Search"; application No. 60/194,342 entitled "Graphical Input Device Having a Grab Switch and/or Rotation Detector"; and application No. 60/194,229 entitled "Zooming User Interface" all filed on Apr. 3, 2000.

The disclosures of the foregoing applications are incorporated herein by reference in their entirety.

BACKGROUND

This invention relates to computer system architecture and human-computer interfaces.

Definition of Interface

Computers and computer-like digital appliances such as hand-held "PDAs" (personal digital assistants) have become ubiquitous tools of modern society. The utility of such a device depends in large part on its "user interface", what is variably referred to as the human-machine interface, human-computer interface, human interface, user interface or, simply, interface. Many current computers make use of graphical user interfaces (GUIs)—complete with windows and mouse-driven menus. However, the term "interface" encompasses more and may be defined simply as the way a user accomplishes tasks with a product—what the user does and how the product responds. That is the interface.

The inventor has reexamined the cognitive foundations of human-machine interaction to elucidate crucial aspects of why interface designs succeed or fail. Among his findings is that present-day graphical user interfaces, such as those of the Windows and Macintosh operating systems, which are based on an architecture of operating system plus application programs, are inherently flawed. In addition, they have evolved by accretion of disparate and uncoordinated ideas, rather than from principled design criteria, thus they have become unnecessarily large, lugubrious, difficult, and inefficient.

Understanding the User 1

Locus of Attention

Initially, to understand the invention, it is helpful to understand certain concepts related to how humans interact with the world around them. When one is awake and conscious, one's "locus of attention" is some feature or object in the physical world or an idea of which one is intently and actively thinking Humans cannot completely control their locus of attention. For example, if a firecracker explodes unexpectedly behind a person, his locus of attention will immediately become the sound. "Focus," on the other hand, is often used to denote, among the objects on a computer's display, the one that is currently selected. A user's attention may or may not be on this kind of focus when he is using an interface. As shown by research in cognitive psychology, an individual has, at most, one entity on which he is concentrating. Whatever that one object, feature, memory, thought, or concept might be, it is the locus of attention. One can be physically seeing and hearing much more than whatever is the locus of attention without being aware of it. If a person goes into a room looking for a misplaced item, what he or she seeks may be plainly in view but remain unnoticed. It might even have been within the 5-degree cone of his or her foveal vision; yet the person does not notice it because it never became his or her locus of attention. Current interfaces cause user errors by requiring the user to attend consciously and simultaneously to two or more things at once. For example, to know what a command will do, a user must also know what application he or she is using.

Understanding the User 2

Habits

Persistent use of any interface will cause a user to develop habits—it is impossible to avoid developing habits when a system is used repeatedly. An interface that does not allow these inevitable habits to cause problems for the user is desirable. Many of the problems that make products difficult and unpleasant to use are caused by human-machine interfaces whose design fails to take into account the helpful and injurious properties of habit formation. Keeping menu items in fixed places, for example, is generally better than adaptive menus as the habit of moving the cursor to a certain location for a particular result is frustrated when the adaptive menu moves menu items around. Furthermore, habits cannot often be broken by an act of volition; only a time-consuming training process can undo a habit. A computer system can create a nasty trap, for example, by permitting having two or more heavily used applications that differ in only a handful of often-used details. In such a circumstance, the user is guaranteed to develop habits that will cause him to make errors when he attempts to use in one application a method appropriate to only the other.

Understanding the User 3

Automaticity

As used herein, any task one has learned to do without conscious thought has become "automatic." It is because of automaticity that one is able to do more than one activity at a time: All but at most one of the tasks that are performed simultaneously are automatic. The one that is not automatic is, of course, the one that directly involves the locus of attention. When two tasks are attempted simultaneously, neither of which is automatic, performance on each task degrades (a phenomenon that psychologists call "interference") because the two tasks compete for attention. As noted above, humans cannot avoid developing automatic responses. To put it another way: No amount of training can teach a user not to develop habits. Any sequence of actions that are performed repeatedly will, eventually, become automatic. A set of actions that form a sequence also becomes clumped into a single action; once one starts a well-learned sequence of actions, such as typing the word "the", he will not be able to stop the sequence; but will continue executing the actions until that clump is complete. In voice-input systems a clump may be a spoken word or a whole phrase. One also cannot interrupt such a sequence unless the sequence itself becomes the locus of attention.

SUMMARY

The inventor has conceived of a new type of interface that is a fundamental shift from prior systems for computer-human interaction. This new system is referred to as a Humane Interface Operating System ("HIOS"). Various methods and apparatus for user interaction that may be particularly useful in the context of the HIOS form parts of the invention, and while some are valuable outside of the HIOS, they work especially well in this context. They also exhibit a synergy that ties them together.

In general, in one aspect, this invention provides methods and apparatus, including computer program products, implementing and using techniques for providing a selection by causing an apparatus to present objects to a user; and provide selection in response to a user input selecting a set of one or more objects and identifying the set as a selection, the objects in a selection having a special status that can be recognized by the apparatus, the selection of one set of objects operating to cause a previously current selection to change state to become a first old selection, whereby both the current selection and the first old selection can be used as operands for a command entered by the user.

Advantageous implementations can include one or more of the following features. Indication can be provided with reference to the cursor position, indication being a recognizable distinction added to every selectable object of content which the cursor points to without any further user action other than moving the cursor, the object pointed to being the indicated object, whereby the user can know at all times at what object the apparatus considers the user to be pointing. The objects can be presented through audible information; and the user input selecting objects can comprise verbal input. The apparatus can comprise a display screen and the instructions may comprise instructions to: cause the objects to be presented on the display screen to a user of the apparatus; and receive a cursor position input from a user and displaying a cursor at the cursor position on the display screen. User commands can be distinguished from other input by a quasimode. If the name of a command name or glyph that represents a command is the current selection and a designated command key is tapped, then the command represented by the name or glyph can be executed. Indication can be provided with reference to the cursor position, indication being a recognizable distinction added to every selectable object of content which the cursor points to without any further user action other than moving the cursor, the object pointed to being the indicated object, whereby the user can know at all times at what object the apparatus considers the user to be pointing. If the name of a command name or glyph that represents a command is indicated and a designated command key is tapped, then the command represented by the name or glyph can be executed. The user can create a single-object selection by tapping a button while an object is indicated. Multiple objects can overlap when displayed, and the apparatus can respond to small motions of the cursor within the area of the overlap of selections and cause the indication to cycle through all the overlapping selections. When multiple objects overlap when displayed, the apparatus can respond to a position of the cursor within the area of the overlap of selections by causing the indication to cycle through all the overlapping selections. A sequence of characters representing a command may necessarily be the same regardless where the characters appear. A last-in, first-out stack of selections can be created and the first old selection can be pushed onto the stack and a previous first old selection can be pushed down in the stack to become a second old selection and all previous old selections can be pushed down one level in the stack. Each selection in the stack can have a distinctive highlight or label so that its place in the sequence can be observed by the user. The depth of the stack can be limited not by any fixed number but only by the size of available memory including virtual memory. The first old selection can have a distinctive highlight to distinguish it from the current selection. The highlights of older selections can be progressively lighter in color or have some other readily-perceptible gradient or labeling scheme. Multiple characters or objects can be grouped into a set in response to a user action; wherein all items in the set are all selected together or not. Selecting an old selection can make it into the new selection and all selections in the sequence from the previous new selection to the selection just newer than the selected old selection can be decreased by one in the order. A command that interchanges the current selection and the next most recent selection can be provided. A command that operates to change the order of selections can be provided. The apparatus can be operable to allow a user to create multiple selections that overlap when displayed. A command that coalesces at least two selections as the new selection can be provided. Commands can take any number of selections as arguments can be provided. Typing may not replace selected text or cause the current selection to become unselected. An undo and a redo command may be provided, wherein the undo and redo commands apply to the user actions of making and adjusting selections as well as to other user actions. The undo and redo commands can each have a dedicated key. The undo command can have a dedicated key and the redo has the same key and is activated only when a quasimode key is also held down.

In general, in another aspect, this invention provides methods and apparatus, including computer program products, implementing and using techniques for providing a selection by causing an apparatus to present content to a user, marking particular content to distinguish the marked content from other content, the marking being discernible when the marked content is presented to the user, receiving an input from a user requesting that the marked content be used as a command and using the marked content as a command.

Advantageous implementations can include one or more of the following features. The marked content can be presented on a display device; and the marking can be a highlighting of the marked content. The marked content can be presented audibly; and the marking can be discernible by a response to a user request to play the marked content. The user input can be a tap of a command key. The user input can be an oral command.

In general, in another aspect, this invention provides a user interface, including: means for receiving information from users; means for conveying information to users; a graphic input device; means for users to separate information conveyed to the interface into at least three principle classes: pointing, content, and commands; means for users to distinguish some subset of the content from the remainder of the content. The means for users to separate information conveyed to the interface into at least three principle classes: pointing, content, and commands do not require, but may permit, separate modes.

Advantageous implementations can include one or more of the following features. Commands may be distinguished from other input by a quasimode. Commands may execute when the quasimode is exited. If the name of a command name or glyph that represents a command is selected and a designated command key is tapped, the command represented by the name or glyph is executed. If the name of a command name or glyph that represents a command is indicated and a designated command key is tapped, the command represented by the name or glyph is executed. The sequence of characters representing a command may be the same whether in the form of a menu item, a button, or a typed command. The means to distinguish some subset of the content from the remainder of the content may be to create selections, and where when a new selection is created the selection that until then had been the new selection is not unselected but becomes the "old selection", and can be used as a selection by those commands that are designed to affect or use the old selection. The process of creating old selections may iterate so that there is a sequence of older selections, forming a last-in, first-out stack of selections. The old selection may have a distinctive highlight to distinguish it from the new selection. Each selection may have a distinctive highlight and/or label so that its place in the sequence can be observed by the user. The highlights of older selections may be progressively lighter in color or have some other readily-perceptible gradient. Sets of characters or objects can be grouped, that is, made into a set (by being selected and the command key used, or by being clicked on) such that they are all indicated and/or selected or not together. A grouped set of characters may represent the name of a command and clicking on them may cause the command they represent to be executed. Selecting an old selection can make it into the new selection, and all selections in the sequence from the previous new selection to the selection just newer than the selected old selection are decreased by one in the order. Selecting the old selection may make it into the new selection and vice versa. There may be a command that interchanges the current selection and the next most recent selection. When multiple selections geometrically overlap, small motions of the cursor within the area of their overlap may cause the indication highlight to cycle through all the selections. There may be a command that coalesces at least two of the selections as the new selection. The depth of the stack can be limited not by any fixed number but only by the size of available memory. Commands can take any number of selections as arguments, in accord with the needs of the command. Both content and commands can be selected in order to apply the command to the content. The interface may be both modeless and monotonous. The interface may be modeless. The interface may be monotonous. Material typed without the command quasimode may become content while material typed in the command quasimode, and only such typed material, can be interpreted by the system as commands. The interface may attach to each file in a system (the main file) a second file, the "information document" with information about the main file in order to make the main file more easily found based on information about that file, such as the date it was created, that may not be in the file. Information documents may not themselves be provided with information documents. One of the commands can be a "pin" command which fixes the current selection with respect to its position on the display. One of the commands can be a "group" command which applies to characters in text. Grouped text can be treated as command names.

In general, in another aspect, this invention provides a user interface, including means for receiving information from users; means for conveying information to users; a graphic input device; means for users to separate information conveyed to the interface into at least three principle classes: pointing, content, and commands; means for users to distinguish some subset of the content from the remainder of the content. Textual content is divided by delimiters that are part of a typable character set and which said delimiters can be found by a find command in which the pattern is composed entirely of typable characters, and where the delimiters can also be deleted and otherwise treated exactly as with other characters.

In general, in another aspect, this invention provides a user interface including means for receiving information from users; means for conveying information to users; means for users to separate information conveyed to the interface into at least three principle classes: pointing, content, and commands; means for users to distinguish some subset of the content from the remainder of the content, such that when any suitable object is pointed to, it is highlighted ("indicated").

Advantageous implementations can include the following feature. When multiple selections geometrically overlap, the indication highlight may cycle through all the selections at a predetermined rate.

In general, in another aspect, this invention provides a user interface where messages to a user, from whatever source, appear on a visual display to be transparent in whole or in part in order to not obscure information underlying them.

Advantageous implementations can include one or more of the following features. A user can work on the material that appears to underlie the transparent message as if the transparent message were not there. A transparent message may disappear when the user resumes work involving the information that lies under the message. A transparent message can gradually fade from view with time, or otherwise gradually becomes invisible. The content of a message can be stored in a message log so that it can be accessed and read at any later time. The transparent message can contain buttons, check boxes, radio buttons, and/or text input boxes and/or possibly other interactive areas, and may not fade or disappear until all required user input has been received.

In general, in another aspect, this invention provides a user interface where the functions of Undo and Redo are each on a dedicated key.

In general, in another aspect, this invention provides a user interface where the function of Undo is on a dedicated key and where the function of Redo is on the same key and activated only when a quasimode key, such as a Shift key, is also held down.

In general, in another aspect, this invention provides a user interface where Undo and Redo, however invoked, apply to the process of making and adjusting selections as well as to other operations and commands.

In general, in another aspect, this invention provides a user interface where a pattern-matching search proceeds circularly through the document or searchable entity in which resides the current system focus, and if no match is found, proceeds to search other documents or searchable entities on the same system, if no match is again found, to search on any resources outside the system to which the system has access, until a match is found.

Advantageous implementations can include one or more of the following features. The search may proceed through all documents or searchable entities in the same level of hierarchy in which a document or searchable entity is embedded, and then, if no match is found, proceed to the next higher level and repeating the process. The concept of hierarchy may include any structure imposed on information stored on a network, whether the structure is nested, in the form of a tree, or otherwise organized. The concept of hierarchy may include any structure imposed on information stored on a network, whether the structure is nested, in the form of a tree, or otherwise organized.

In general, in another aspect, this invention provides a user interface with objects and commands implemented such that if a command cannot be applied to an object because the object is of the wrong data type or format, the implementation seeks a program, called a "transformer", that can convert the object into a representation of the correct data type or format, and execute the command.

Advantageous implementations can include one or more of the following features. A set of transformers available to the user interface may be examined to determine if there is a sequence of those transformers that can convert the object into a representation of the correct data type or format, and execute the command if there is such a sequence. Any command can be applied to any object whether or not the object and command are from the same software supplier or were designed to work together. If the system is unable to apply the command in an object, the object may be left unaffected. When the object is left unaffected, the user may be informed by a message or other signal that the command had no effect on the object.

In general, in another aspect, this invention provides a user interface wherein a typed character is always inserted into the text at the cursor location and there is no means for making the typed character automatically replace selected text.

In general, in another aspect, this invention provides a graphic input device (GID) designed for a user interface that interprets squeezing or holding of buttons designated for this purpose and which are situated as if to hold or grip the GID as a distinct "grip" signal that the current selection is to be dragged, that is, to move in parallel with the cursor, for as long as the signal is maintained. By releasing the pressure on the GID or buttons, the user signals the user interface that the selection is in the desired location and it no longer follows the cursor.

Advantageous implementations can include one or more of the following features. The selection may remain selected after it is released. A first sending of the grip signal may cause the selection to begin moving in parallel with the cursor and where a second sending of the grip signal may cause the selection to no longer follow the cursor but to remain stationary. The selection may remain selected after it is released.

In general, in another aspect, this invention provides an interface where while pressing a first button makes the apparent magnification of the entire display greater, called "zooming in", and while pressing a second button makes the apparent magnification of the entire display smaller, pulling in additional material from the sides (called "zooming out").

Advantageous implementations can include one or more of the following features. Pressing and holding both buttons may cause the material on the entire display to move or "pan" as if attached to the cursor, pulling in additional material from the sides as necessary. Help information may be embedded adjacent to and at a small size relative to the object to be explained and can be accessed by zooming in to the information. The object being zoomed into can be a document or Web site, or any other interactive or active object, and when the object reaches a certain size, it may become active without requiring any further user action. When an active object is zoomed away from, when it reaches a certain size, it may become inactive. The first and second buttons may be placed on the GID. Instead of pressing a first and second button, the GID can be twisted clockwise to zoom in, and counterclockwise to zoom out. The rotation on the twist can be reversed.

In general, in another aspect, this invention provides an interface that receives user input through the user interface. Output is provided through the user interface, and all user input received through the user interface is interpreted as explicitly being separated input into one of three classes, namely, pointing input, content input, and command input.

Advantageous implementations can include one or more of the following features. The information may be separated into classes by delimiters that are contained within the information. The delimiters may be part of a typable character set. The delimiters may be deleted and otherwise treated exactly like other typable characters. The delimiters may be found by a find command. Pointing input may be comprised of user input conveying a selection of content by the user; content input may be comprised of user input conveying information that has meaning and utility for the user; and command input may be comprised of user input conveying a signal to the information appliance to perform some operation. The user interface may include a keyboard, a graphical input device (GID), a mouse, or a microphone to receive user input. The mouse may be a squeeze mouse having one or more buttons that can be pressed, squeezed or held by the user.

The invention can be implemented to realize one or more of the following advantages. The overall and cumulative effect of this invention decreases learning time, improves user retention of their learning of a system, increases user satisfaction, decreases frustration, increases productivity, and decreases the number of actions required to do a task thus reducing the danger of repetitive stress injuries (RSI) in many systems. On the basis of this invention, computers and related appliances can be used more easily, more quickly, and more safely than with prior art interfaces.

The details of one or more implementations of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Terminology

Figure 1:
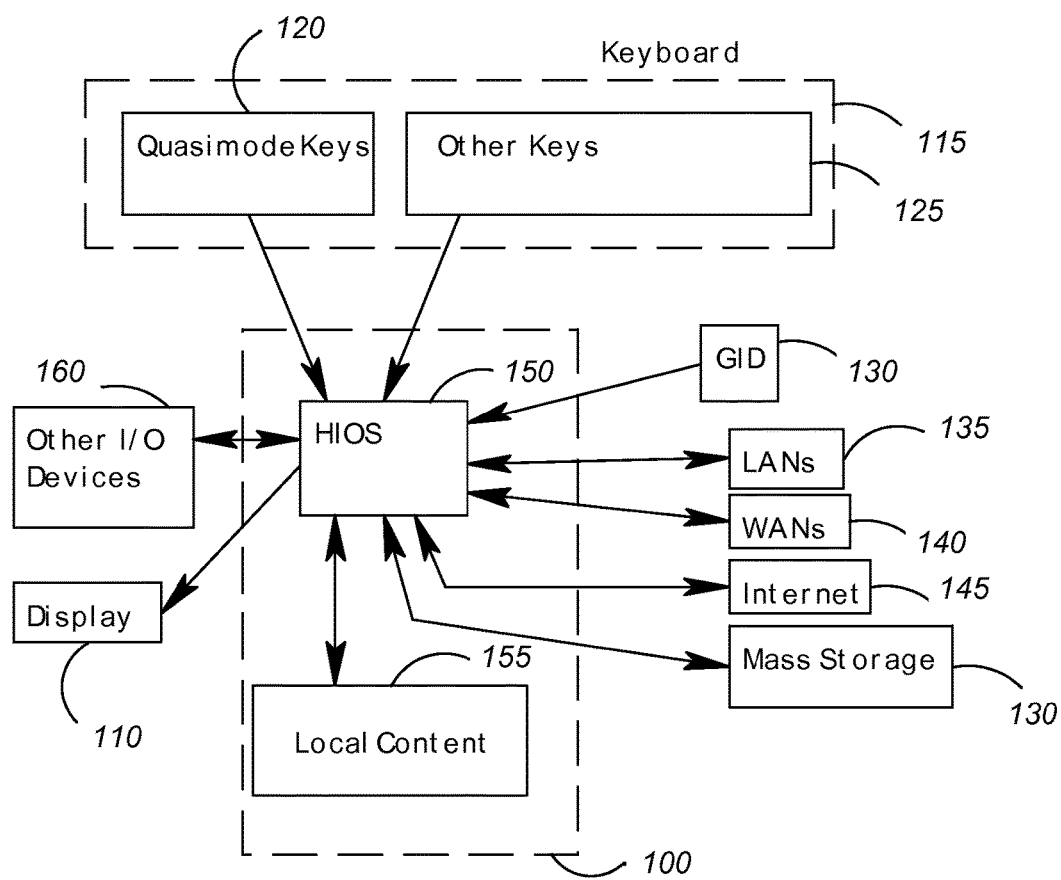
FIG. 1 is a schematic block diagram showing one hardware implementation of the HIOS in accordance with the invention.

In order to illustrate the invention with precision, a few definitions are useful:

"Cognetics" is the engineering applications of cognitive psychology, much as ergonomics is the engineering applications of physiology.

A "gesture" is an uninterruptible sequence of automatic actions such as those just described.

"Content" is the information that resides in a computer or other information processing device that has meaning and utility for that system's user. Creation or alteration of content is the task the user intends to accomplish with the device. If the user is a writer, the content is those writings that are stored in the system. If the user is an artist, graphics are the predominant content of the system. Where the system is a computer, the menus, the icons, and other paraphernalia of the computer are not content.

A "graphical input device (GID)" is a mechanism for communicating positional information, such as a particular location or choice of object (which may be content or part of the system) on a display, to a system. Typical examples are mice, trackballs, lightpens, tablet pens, joysticks, or touchpads. The GID "button" is the principal button on any GID—for example, the left button on a two-button mouse. In general, the graphic input device controls the position of a cursor, which is an arrow or other graphic emblem on the display that indicates the system's interpretation of where the user is pointing.

A "microphone" herein refers to the use of a microphone as a sound input device used to provide information to the system. A host of other devices that can detect human activity, including physical motion such as with a data glove or video camera or electrical activity such as direct detection of brain or nerve impulses or waves can also be used for generating input and control signals.

A "tap" is the act of pressing and releasing of a key or switch without any intervening action. Tap applies only to keys on a keyboard or to other momentary contact switches that, when released, automatically return to their original position and electrical state.

To "click" is to position the GID, and then to tap the GID button. The term is used in expressions such as "click the word 'alligator'," indicating that the user is to move the cursor such that it points to "alligator" and then, while the cursor remains stationary, tap the GID button. This operation constitutes "clicking on alligator." To "drag" is to press the GID button at one location, and then to move the GID before releasing the GID button at a new location (this action is sometimes called "click and drag"). To "double-click" is to position the GID and then to tap the GID button twice quickly, without any intervening motion of the GID or other user action. (In practice, a small amount of GID motion is allowed, because it will usually move slightly when the button is pressed.) Triple and higher-order clicks have been used in interface design.

"Highlighting," as used herein, is adding, by any means, a recognizable distinction to a displayed object. The function of the highlight is to allow the user to determine, by passive observation, that the system has recognized a particular object as having a special status. For sighted users, the highlight is usually visual. Examples of visual highlighting mechanisms include underlining or applying a stationary or animated border to an object. Nonvisual highlighting can be shown, for example, by different choices of voices or spoken inflection or by a tactile distinction such as a vibration.

Highlighting the single object pointed to as a cursor is moved, without any other user action (such as clicking), is referred to herein as "indication." With indication, the user knows at all times at what object the system thinks she is pointing. In too many conventional systems, the user must guess at what will be selected or activated when she clicks the operations GID button; if her guess is incorrect, she will have to try again, wasting time and energy. Indication can be especially valuable when the objects that the user would like to select are small and close together, when they overlap, or when their limits are unclear. Indication differs from prior art "rollover" in that indication specifically shows what object is being pointed to; rollover consists taking some arbitrary action when an object is pointed to, and is not used systematically to indicate a potential selection.

Indication allows the user to identify the content that may be affected by the user's subsequent action, for example, what will be "selected" if the user clicks the left mouse button in most conventional systems. Another advantage over prior art systems interfaces lies in the ability of indication to distinguish objects such as or analogous to icons, drawing elements, or photographs that may overlap, interdigitate, or may be small and close to one another on the computer screen. As the GID is moved, or as a function of time while the cursor lingers at one position or within a small area, or based on keyboard or button presses, different overlapping objects can be indicated. Clicking when the desired object is indicated allows the user to unambiguously communicate to the system which is meant. Even in situations where the content is text, it is often difficult to determine at what portion of the text the GID is pointing at any given moment.

A "command" is a signal to a computer to perform some operation, usually involving an operation on the content (such as making a text selection boldface or sending a selection to a printer) other than accepting input (say, via typing or speaking) and similar operations.

The invention provides a system of indication that is substantially universal to the interface and uniform in application. In other words, in the HIOS indication almost always occurs and it occurs in a consistent and predictable fashion. The present invention provides various apparatus and methods for providing such a system of indication.

"Selecting," as used herein, is a process by which a user identifies a set of one or more objects as having a special status that can be recognized by the system, thereby creating what is called "a selection." Usually, a user creates a selection with the intention of applying a command to it in the near future. Unlike indication's more transient highlight, the highlight that signals selection persists even after the user has moved the cursor away from the selection. Indication may take place as the cursor is moved even if a selection has been established. The user may variably create a single-object selection by tapping the GID button, microphone button, or by means of some other signal, while the object is indicated. A user can also create a selection by dragging a rectangle or other shape across a set of contiguous objects: All objects that intersect the area of the shape become selected. Another kind of selection selects all the objects that are totally within the area of the shape. Selection can be of discrete objects, of geometrical regions of the display, or can be composite, consisting of the union of different selections. In much of today's software, the user creates composite selections from a set of smaller selections by first making an initial selection. Then, with one common method, she presses and holds shift, and while she is in this quasimode ("quasimode" is defined in more detail below)—she clicks on additional objects to toggle them into or out of the selection.

There are several drawbacks to this prior art selection method: First, the command for creating composite selections is invisible and thus its existence and behavior must be memorized by the user. Second, it is easy to make errors when setting up a large composite selection; for example, if the user accidentally releases the shift in the middle of the process and clicks on another object, her work in making the complex selection up to that point is lost. Third, the mechanism is a toggle: The same gesture deselects an object if that object was selected, and selects an object if that object was not selected. This property can easily create problems if the user or the computer system is unsure of the object's initial state, indeed, users of conventional systems are often seen to have this problem. There are isolated prior art selection methods that answer some of these objections, but none that answer all, and they are confined to isolated application programs and are not systemic.

Solving the Selection Problems

The HIOS solves the problems with selections, and increases the power of interfaces, by providing what is effectively a "stack" of selections. When a selection is made, the previous selection changes state to become the "first old selection". This selection process can be iterated so that as the user creates new selections, the most recent selection becomes the first old selection, the next most recent selection becomes the second old selection, and, in general, the nth old selection becomes the n+1st old selection. It is best if the only limitation to the size of this selection stack is the amount of available memory. The highlighting that signals selection is distinct from and more readily apparent than that used for indication (if indication is present). The highlighting for older selections also makes them clearly distinguishable from one another. For example, the highlight of older selections may be of lower visual contrast than newer ones, or an alphanumeric designation may accompany old selections so that they can be readily identified. This is especially useful if the number of selections becomes large. Alternatively, the selection highlight could be animated, in "marching ants" or "marquee" style, with the animation moving more slowly the older the selection is.

Having old selections permits multiple-argument commands, where the arguments are selections. For example, to interchange two objects it suffices to find and select the first and then find and select the second object and then issue the "exchange" command. Prior art systems do not have a natural way of doing this, and one must presently find and select the first object, issuing first a copy command and then deleting the first object from the first location, then finding the second location, and then inserting the first object into the second location; then the user selects the second object to be interchanged, using the copy command and the delete command on the second object, finding for the second time the location of the first object, and then insert the second object. At any point in this process, should the user be interrupted and have to perform another move (not even an interchange) of a third object, then one or the other of the first two objects being moved will be lost (permanently in many conventional systems).

In the case of overlapping selections, the nature of the content and the task defines the interpretation. In some embodiments, a new selection simply is not permitted to include any part of a previous selection; in others, a new selection that impinges on an old selection causes the old selection to become unselected. In the preferred implementation, and again depending on the nature of the content and the task, interchanging two overlapping selections would result in two non-overlapping but adjacent selections. For example, if the content was the word BIT, and the first selection included the letters BI and the second selection included the letters IT, then, upon being interchanged, the result would be ITBI.

The Elementary Actions

The spectrum of elementary actions that a user can perform is a remarkably limited one that also belies the apparent complexity of using a computer system. From this set of elementary actions, all user interaction is built. With a keyboard, one can tap keys or press and hold them while performing other actions. With GID, the user can move a cursor within the bounds of the display (or displays) on the system, and can signal using the computer using the speed, direction, and acceleration of the GID. With a GID button, the user can signal locations on the display to which the user is pointing with the cursor. These elementary actions have widely varying semantics depending on the application being run.

While most of the foregoing and following is cast in terms of keyboard input to keep the exposition brief and clear, all of the principles apply equally well to gestural, sound-controlled, and other human-controlled systems because of the universal nature of human locus of attention, habit formation, and other cognetic principles.

Some other common operations, such as moving content from one location to another can be broken down (at the implementation level) into combinations of the above; in this case, for example, motion consists of a replication followed by a deletion of the original. At the interface level, a command for moving objects would probably be supplied. One way that commands are invoked is treated below.

Other input information also fits into this paradigm, for example, some graphic tablets are pressure sensitive and can detect the angle at which the pen is held, which results in one or two additional numerical values being associated with each location to which the user points. Except when the user is doing freehand drawing, these parameters are rarely used. Musical keyboards may provide, as inputs to the computer, both the velocity with which the key is depressed and the pressure with which the key is being held down after being depressed. There are also joysticks and three-dimensional input devices. Each of these associate a set of numbers or a sequence of values with the user actions. This is in no way fundamentally different than most interaction, which is accomplished with a keyboard and a standard, two-dimensional GID. This description will generally be presented in terms of the standard input and output devices; however, the principles extend to more exotic interface hardware elements and methods. This description will generally be presented in terms of the standard input and output devices; however, the principles extend to more exotic interfaces.

The Elementary Operations

Although interfaces to prior-art software may seem complex, in reality the different operations that are performed by the user with the interface are relatively few and simple if looked at from a different perspective, one based on elementary user actions. The user performs the elementary actions in various combinations to perform a set of elementary operations. The elementary operations are performed on "content" (all the material resident in the computer, created or brought into the system directly or indirectly by the user, that can be examined or otherwise operated upon) and are used in nearly every interface. Content consists of "objects" (not necessarily the "objects" of "object-oriented programming") that have separate meaningfulness in the user's mind.

There are three elementary operations on content:
Indication: the displaying of the fact of some subset of the content being pointed at by a cursor or otherwise being pointed at by a distinguishing highlight. In a sound-based system, the highlight might be a special sound or sound quality, and so forth for other media.
Selection: distinguishing some subset of the content by means of a selection highlight, distinguishable from the indication highlight. Content is selected primarily so that a command may be applied to it.
Modification: applying a command to a selection or set of selections with the intent of changing, using, or acting on the content selected.

There are many ways that content may be modified. Some of the more fundamental modifications of content are:
generation (modified from empty to nonempty);
deletion (modified from nonempty to empty);
collection (being formed into a group, and its inverse, ungrouping);
transformation (changed to another data structure or representation; for example changing a line from red to green or changing a bit-map into text via optical character recognition); and
replication (a duplicate placed at another location, which can include external devices such as a printer (printing), a network (emailing or uploading), a hard disk (storing) or merely duplicated into another document (copying)).

In the system in accordance with the invention, handling the elementary operations are part of the internal hardware or software, rather than being reimplemented in multiple software packages, and each of them can always be invoked in the same way, regardless what objects are operated on. For the most part, the cognitive differences between presently available applications lie in how selections are presented and how the user can operate on them. For example, in a spreadsheet, values are presented in tabular form, and an operation might consist of changing a column without a sum underneath into a column with its sum underneath. In a word processor, text and illustrations are presented in page-layout form, and a typical operation is to change text from a roman typeface to an italic typeface. In a web-page program, a word processor page might be changed into HTML. In a photo-processing program, an image with low contrast might be modified into one of higher contrast.

Most operations performed on content can be described in terms of the elementary operations listed above. For example, in many systems, an object can be queried about its properties (in systems equipped with two-button GIDs, the user usually performs this function by a click of the right button when the cursor is on the object and the system is in an appropriate state). To "query" is to bring up further information or options on the item, but it also can be thought of as an operation on one object that brings into view another, related object. From the user's point of view, there is no need for any distinction between "operating-system" operations and "application" operations.

That the interfaces of all applications arise from a small set of elementary operations confirms that the applications themselves, as rich and varied as they are from a task-oriented point of view, are not all that different from one another from an interface-oriented point of view. This fundamental similarity is exploited by the invention to create powerful computer systems of unprecedented simplicity and productivity.

Text Handling

Another way in which current applications are similar is that nearly all of them require text entry. It is thus worth insuring that text handling—whether in the small (for example, when the user is entering the string on which to execute a find command) or in the large (for example, when the user is writing a novel), is accomplished with a smooth and efficient set of operations.

Users and the software they use are not perfect; not all text-entry keystrokes, pen motions, or acts of speech will cause the desired characters to be displayed. Therefore, an important provision of an interface is that keystrokes can be erased with an immediate tap of the backspace (or delete) key—with analogous methods for other forms of input. Larger changes, such as adding a paragraph, require that the user be able to select regions and to delete them. Another fundamental requirement (except for brief inputs) is that the user be able to move the cursor to any point in the text and to insert additional characters. In short, whenever text is to be entered, the user expects to have available many of the capabilities of a modern word processor.

Whenever the user is entering text, it is placed it into a document or a field (such as an area provided for entry of a name on a form). With conventional systems, the rules about what editing functions are available change from field to field and from one document type (for example, a word-processor document) to another (for example, a spreadsheet). The editing rules can change within a single document in systems that allow the document to include portions generated by separate applications.

One important step in creating an interface in accordance with the invention for computers and or for computer-like systems, such as a Palm Pilot™, is to ensure that the same rules apply whenever text is being entered, and when editable text is selected. For example, on the Macintosh® computer or in the Windows® operating system, the user cannot spell-check a file name in situ, so if the user is not sure of the spelling of "rendezvous," and she wants to use that word as a file name, the user will have to guess at the spelling or open a word processor and retype or drag "rendezvous" into that word processor to check it. In the invention, one spelling checking command suffices for any text, whatever role that text might be playing at the moment.

There is another interaction of typing and selection that causes problems in current interfaces. In the system in accordance with the invention, typing does not replace selected text or cause the current selection to become unselected. This is the opposite of the common convention that typing replaces the current selection, a practice that occasionally causes users considerable problems when the new material unexpectedly overlays text they did not want to omit. The idea that typing should replace a selection was introduced to save a single keystroke: In most editors, when one wishes to replace a block of text, the user simply select some text and then type. Without this convention, the user would select some text, tap the backspace or delete key, and then enter some text. Currently, all that is eliminated is the backspace. With the usual convention, the text vanishes at the first keystroke and typing is inserted. This happens whether the text to be replaced was on screen or not and (usually) whether it was a few characters or three quarters of the novel being written; the user may be deleting text that is 40 pages away from his locus of attention. If the problem is noticed in time, it can possibly be undone. However, if the user does not notice the deletion—and there is nothing in conventional systems that indicates that text has been deleted beyond the screen changing to show the page just deleted from (one page of text looks much like another, and there's nothing to show that material was deleted)—the user will lose content and time. The system in accordance with the invention does not put the user's work at risk; the one saved keystroke in this case of this prior art feature is bought at too great a price—if even only one character is lost inadvertently, that character might be part of a phone number or part of an e-mail address that is cannot be guessed from the remaining text. The interface in accordance with the invention requires the user to explicitly delete text if he wants to delete text, and does not delete it as a side effect of some other action.

Another word-processor feature often considered helpful is the ability to drag a selection from one place to another in text. However, this "feature" prevents the user from being able to create a new selection overlapping the current selection, or to create a selection that is a subselection of the current selection. Another problem that arises from dragging in text (and also occurs in graphics applications): the user will sometimes start to drag a selection only to discover that the destination is not visible on the display, in which case the user has to put the selection back, or into some other place, and change to the cut-and-paste method. In some prior-art systems the material will begin to move when the selection reaches the edge of the screen, in which case the user can make a long drag work, but it is a slow process and it can be very hard to find the desired destination. The principle of monotony suggests that having only one method is preferable. One solution is to not allow the drag-and-drop method in text. Another solution is to provide separate quasimodes for selection and dragging, because the user could then have both selection and drag-and-drop without cognitive interference. For example, if the GID had a button that was pressed to make selections and if it also had a facility, such as a side-mounted button, that allowed squeezing the GID (with tactile feedback such as a click to signal that the squeeze has been registered) to indicate that the user has grabbed a selection, then there would be little or no confusion between the two functions.

Another problem with conventional interfaces is the cut—and—paste paradigm. Almost every user of a cut—and—paste—based editor has experienced the loss of some work when she inadvertently performed a second cut before pasting the first. When text is deleted it should not disappear, especially not into an invisible cut buffer. In one implementation of the system in accordance with the invention the text appears as the last item in a deletion document that collects deletions. The deletion document is just an ordinary document; it can be treated as ordinary text. Of course, material deleted from it ends up at the beginning of itself. Optionally, a special command deletes in a more permanent way, which is not undoable, and can be designed to operate as a security feature. In one implementation, each deletion added to the deletion document is locked. The essential point is that nothing mysterious happens to deleted text and no special command or knowledge is needed to find the document containing deleted text (beyond having to know that the plain text words such as "This document contains deleted text" is in it; the user could type in any phrase she desires to use as a target for this document). Of course, any phrase in the recently deleted text can also serve to find it, just as if it had not been deleted.

Commands

Fundamentally, there are only two kinds of inputs a user makes to a computer or information appliance: the first kind of input creates or modifies content directly, the second controls the system. Any particular user gesture may be one or the other (and the dividing line may be drawn differently depending on the user's point of view). The second class of inputs is often referred to as "commands". A large class of commands involve applying an action to an object. For example, in operating a word processor the user might select a paragraph and change its typeface; in this case, the object is the paragraph and the action is the selection of a new font. When operating thusly, the interface is following the well known "noun-verb" cognetic paradigm.

Some commands, such as undo, are keyboard, voice, or other input commands that are not necessarily related to selections. Other commands act only with respect to the current selection, such as the command that deletes the current selection. Certain of these commands on prior art systems are invoked by single keystrokes, such as the push of a button marked F4; however, the number of keys on a keyboard or keypad is small relative to the number of possible commands. Each additional modifier key—such as shift, alt, command, control, or option—doubles the number of possible key combinations. A full-chord keyboard (of which the computer can recognize any combination of keys) allows an astronomical number of key combinations; for example, a system that uses any three-key double-quasi-mode combination on a 110-key keyboard can signal any one of over a million commands with a single gesture. However, extensive use of modifier keys, especially in combination, quickly reaches finger—twisting, mind—numbing complexity. In addition, the combinations are rarely memorable or meaningful and do not translate well to other input means such as voice. Learning arbitrary keyboard combinations is difficult; requiring such learning places an unacceptable burden on the user's memory. In addition, such commands are not visible to the user unless the system displays what their effect will be whenever they can be invoked. Of course, if there are times when one of these gestures cannot be invoked, or if the gesture has different meanings at different times, the system is modal with respect to that gesture—giving rise to a different set of problems and errors which occur when the user does not know what mode in which the system is currently operating. Avoidance of such modal behavior has long been recognized as a goal of interface design.

If the system is divided into applications, such that a particular command can be reused but is given different meanings in different applications, the number of commands that a user can invoke for a given number of key combinations is increased, but reuse of commands by applications that assign those commands different meanings causes the user to make mode errors. Varying the meanings of a gesture can also place an unnecessarily heavy burden on a user's memory. This burden is partially relieved in prior art systems by menus, although the user still has to remember in which menu the command he seeks is hidden (he may have to first recall which application contained the desired command, especially if several applications have similar capabilities). This process of looking through menus is sometimes trivial, but it can be frustrating, especially if the command the user seeks is a few submenus deep and if what was to the designer the obvious way to organize the menus is not obvious to the user.

Conventional desktop GUIs are a compound of at least two distinct interfaces, a relatively visible and learnable but time-consuming menu-based system and an incomplete keyboard- or microphone-based collection of hard-to-learn and unmemorable shortcuts. Both these methods have inherent drawbacks that may be avoided with the invention.

The invention provides a system for invoking commands that is as fast and physically simple to use as typing a few keystrokes and that makes the commands easier (and faster) to find than does a menu system. It avoids duplicating the dual method used in most popular GUIs that includes both a slow menu—based system and an inscrutable set of keyboard shortcuts.

The invention also provides improved methods and apparatus for entering receiving, recognizing and executing commands input by a user to a computer system. The invention provides a simple, flexible method for executing commands that is universal across the entire interface, regardless of context.

In one implementation of the invention, the user enters commands by typing and selecting them or by selecting existing text representing the command and then pressing a dedicated or assigned command key. For example, to execute a print command, the user simply types the text "print," selects it with the GID and taps the command key. In another implementation, the word or graphics representing the command are grouped so that they merely need be indicated for a tap of the command key to invoke them. Alternatively, a system could require that the command be selected prior to tapping the command key. In another implementation or along with other implementations, the user can hold down the command key to establish a command quasimode, much as one now holds down a shift key for typing capital letters, while typing the text representing the command. When the user releases the command key, the command is executed. In any of these implementations, a further optional aspect of the system recognizes the form of the content upon which the command is to be executed and, if the form is not appropriate to the command, the system will apply a transformer (a program that modifies the data type so as to make the data operable on by the command) to the content, execute the command on the transformed content and can, for those commands where it is appropriate and possible to do so, apply an inverse transformer to return the content to its original form after the command has successfully executed.

Undo and Redo

The inevitability of habit formation discussed above also has implications for command execution. For example, computer systems that, before they will perform an irreversible act—such as deleting a file—ask, "Are you sure?" are commonplace. The user then must type, "Y" for "Yes" or an "N" for "No" in response to the question. The idea is that, by requiring one confirm a decision, the system will give the user a chance to correct an otherwise irrecoverable error. Unfortunately, one can readily make an accidental deletion even when this kind of confirmation is required. Because errors are relatively rare, a user will usually type "Y" after giving any command that requires confirmation. Due to the constant repetition of the action, typing "Y" after deleting soon becomes habitual. Instead of being a separate mental operation, typing the "Y" becomes part of the delete-file action; that is, a user does not pause, check his intentions, and then type the "Y". The computer system's query, intended to serve as a safety measure, is rendered useless by habituation; it serves only to complicate the normal file-deletion process. The key idea is that any confirmation step that elicits a fixed response soon becomes useless.

A more effective strategy employed by the invention is to allow users to "undo" an erroneous command, even if they have performed intervening actions since issuing that command. A universally applicable pair of undo and redo commands is provided, for which the only limitation to the number or levels of undo permitted is that due to available storage. Undo and redo is also pervasive, applying to any operation where undoing and redoing is logically possible. They are also—again, as far as is logically possible—inverse operations. Undo followed by redo (and redo followed by undo) will cause no change to the content. Obviously, the commands do not apply to themselves. Undo and redo operators are fundamental and are of sufficient importance to have their own dedicated key in the preferred implementation, where redo is implemented as shift-undo, with the key cap clearly marked with the words "undo" and "redo." In one embodiment, a command that permits undoing and redoing into a newly created region that consists of all the documents the undo takes the system through allows for recovery of old work without losing what has been done since.

Abolition of Modes

"Modes" are a significant source of errors, confusion, unnecessary restrictions, and complexity in interfaces. Many of the problems modes cause have been widely recognized; nonetheless, making systems truly modeless is an underused tactic in interface design. As defined above, a gesture is a sequence of human actions that is completed automatically once set in motion. While, to use our example, typing a common word—such as "hello"—is a single gesture for an experienced typist (and a single spoken gesture as well) the typing of each letter would be a separate gesture for a beginning typist (whereas to someone unfamiliar with English's sounds might utter each syllable as a gesture: heh-low).

Most interfaces have multiple interpretations of a given gesture. For example, at one moment, tapping the return key inserts a return character into the text, whereas at another time, tapping return causes the text typed immediately prior to that tap to be executed as a command. Modes are manifested by how an interface responds to gestures. For any given gesture, the interface is in a particular "mode" if the interpretation of that gesture is constant. When that gesture has a different interpretation, the interface is in a different mode.

A simple example may be useful to further illustrate the concept of modes. A flashlight (assumed to be in good operating condition) that is operated by a push-button toggle can be either on or off. Pressing the button turns the light on if the present state is off, and turns the light off if the present state is on. The two states of the flashlight correspond to two modes in the interface: In one mode, tapping the button turns the light on; in the other mode, tapping the button turns the light off. If the user does not know the present state of the flashlight, he cannot predict what a press of the flashlight's button will do. If the flashlight is deep in a duffel bag where it cannot be seen, one cannot check by feel if it is off or on (assume that it does not get detectably warm). If the user's intent is to make sure that it is off, it will have to be taken out and inspected. The inability to determine the state of the flashlight is a classic problem caused by an interface that has modes; one cannot tell by inspecting the controlling mechanism what operation needs to be perform to accomplish a given goal. If one operates the controlling mechanism without separately verifying the state of the system, one cannot predict the effect that the operation will have.

Similarly, if the current state of the interface is not the user's locus of attention, and if an interface has modes, the user will sometimes make errors because his locus of attention is not the current mode. Thus, a human-machine interface is "modal" with respect to a given gesture when (1) the current state of the interface is not the user's locus of attention, and (2) the interface will execute one among several different possible responses to the gesture, depending on the system's current state.

Modes also restrict a user's scope of activity. If a gesture g invokes action a in mode A, and action b in mode B, then, if the user is in mode B and wants to invoke action a, he must first leave mode B and set the interface into mode A. Only then can the gesture g be used to invoke a. The division of an interface into bounded sets of functions is a necessary consequence of modes; the set of states where the gesture g has a particular interpretation can be called the "range" of g. Software sold as an application—for example, a spreadsheet—usually consists of one or more overlapping ranges. Grouping commands into separate ranges (what are usually called "applications") can be an aid to understanding and using a complex interface, but there are ways to organize an interface that are less restrictive than are modes.

Modes that vanish after a single use cause fewer errors than those that persist, if for no other reason than that they have less time to cause mistakes. If one uses a temporary mode immediately after setting it, the fact that one set the mode may not have evaporated from short-term memory, and a mode error will not be made. One may even incorporate setting the mode as part of the gesture that carries out the command, which makes the situation completely nonmodal for that user. However, if the interface mode for a command is set, and—prior to using the command—the user is delayed or distracted, then a mode error is likely to occur.

Quasimodes

There is a significant difference between using the caps lock key to type capital letters and holding the shift key to the same effect. In the first case, a mode is established; in the second case, it is not. Experiments have confirmed that the act of holding down a key, pressing a foot pedal, and any other form of physically holding an interface in a certain state does not induce mode errors. Activating and holding a control while performing another user action has been referred to as a "spring-loaded mode" and a "spring-locked mode" in the literature. This terminology is inappropriate because no physical spring may be involved, the key or button is not locked, and holding a control does not cause mode errors. The phrase "user-maintained mode" for this action is accurate but makes it difficult to frame a corresponding adjective. Accordingly, the term "quasimode" and its adjectival form, "quasimodal," are used herein to denote modes that are maintained kinesthetically.

Quasimodes are very effective in eliminating modes; however, the excessive use of quasimodes can lead to absurd interface conventions that require the user to remember dozens of arbitrary commands. The limit for the number of effective quasimodes is probably between four and seven. But one quasimode can solve a multitude of varied problems.

A typical problem that is readily solved by the use of quasimodes occurs when an interface presents the user with a one-of-n set of choices. The Macintosh's pull-down menus are an example. In this application of quasimodes, the user presses and holds down the graphic input device button when, on the name of the menu, the other choices appear for as long as the button is held down. The cursor is then moved to the desired item and released on that item to make the menu choice.

Another use of quasimodes is to cycle through a set of options. As long as the cycle starts on the same element in the set and proceeds in the same order (and so long as there are not too many elements), then a fixed number of taps chooses the option. For example, in the design of the prior art Canon Cat system, the user could change a selection to any of four paragraph styles—left aligned, centered, right aligned, and justified. Paragraph styles were chosen by repeatedly tapping the key that had the legend "STYLE" on its front. To access a key with a front legend on the Cat, the user held down a special shift key that was marked (on its top) "Use Front". In general, the Use Front key allowed the user to execute the function indicated by the legend on the front of a key. Because paragraph style was a quasimode (Use Front had to be held down while tapping the paragraph style key), the Cat knew how many times the key had been tapped. As a consequence, the user soon learned that one tap left-aligned the selection, two taps right-aligned the selection, and so forth. Had the software cycled from wherever the user last left off (as many interfaces do), there would have been no way of making the use of the paragraph style command habitual; the user always would have had to look at the display to know what was happening.

Fundamentally, there are only two kinds of inputs the user makes to a computer or information appliance: inputs that create content or inputs that control the system. In the invention, quasimodes (other than the usual Shift key) are generally reserved for control functions. Operations performed when no quasimode is engaged create content.

Monotony

Designers of interfaces often present users with a choice of methods. For example, there may be both a menu item and a keyboard shortcut that execute the same command. In most prior art word processors a user can move a contiguous portion of the text by either the three steps of selecting, cutting, and pasting; or by the two steps of selecting and dragging; and the selection process itself can be invoked in more than one way. The user has a smorgasbord of methods.

One justification for having multiple methods to do a given task is that some users prefer one method and other users prefer a different method. For example, one user might be a novice who finds menus easier to learn although another user might be an expert who would rather keep her hands on the keyboard and issue commands by typing them. Another justification is that one method, for example selecting, cutting, and pasting, is useful between distant portions of a document and the other method, selecting and dragging, is effective only when the source and destination are both visible on the display. Another reason for a plurality of methods is that each of them is sanctioned by custom, and the developers felt that it was wise to accommodate as many previously developed skills as possible. None of these justifications is satisfactory.

The cognetic term "monotonous," is used herein to describe an interface feature which provides only one way to accomplish a task Monotony is the dual of modelessness in an interface. A modeless interface is one where a given user gesture has one and only one result: Gesture g always results in action a. However, there is nothing to prevent a second gesture, h, from also resulting in action a. A monotonous interface is one where any desired action has only one means by which it may be invoked: Action a is invoked by gesture g and is invoked in no other way. An interface that is completely modeless and monotonous has a one-to-one correspondence between cause (gesture) and effect (actions). The more monotony an interface has (for a given task space), the easier it is for the user to develop automaticity, which, after all, is fostered by not having to make decisions about what method to use.

When one has to choose between methods the locus of attention is no longer the task and temporarily becomes the decision about methods itself. This is a primary reason for choosing to design a monotonous system. If the conditions for making the decision are sufficiently clear and distinct, then the path the user takes in each case can become habitual and he have monotonized the situation. An efficient monotonous solution gains benefits including ease of learning, simplicity of implementation, minimization of documentation, and lowered maintenance costs. Monotony does not mean that the same content cannot be arrived at in many ways, but that there should not be multiple gestures to invoke the same command.

The inventor believes that an interface that is, insofar as possible, both modeless and monotonous—all other design features being of at least normal quality for a modern interface—would be extraordinarily easy and pleasant to use. A user would be able to develop an unusually high degree of trust in his habits. The interface would, from these two properties alone, tend to fade from the user's consciousness, allowing him to give his full attention to the task at hand. Many of the details of the invention aid in the creation of monotonous systems.

Noun-Verb Design and Closure

In the HIOS, the well-established preference for "noun-verb" design (wherein one chooses he object to act on before choosing the action) over "verb-noun" design (where one chooses the action and then specifies what is to be acted upon) has been employed. Verb-noun designs tend to be modal, because once the verb is selected, the user is in a mode where the next object selected will be acted upon. In contrast with prior-art systems, where noun-verb design has been a desideratum to be applied locally, it is here the basis underlying almost all interaction. In particular, that nearly all tasks are accomplished by choosing a selection and then a command constrains interaction to the preferred noun-verb method. Another aspect of this is the use of "closure". Cognitive psychology tells us that preparing in advance for an act is difficult but that choosing an immediate action is easier. For example, a Print dialog box may have the user make a choice of whether to print the entire document or just the current selection by means of having check boxes or radio buttons. Once thus set up, a click of the PRINT button brings closure to the operation. However, the user, seeking closure, often forgets to set the choice and just PRINTS, only to discover that they have printed the wrong object. If the system had no check boxes or radio buttons but only two launch buttons "PRINT DOCUMENT" and "PRINT SELECTION" then the user would be able to make the choice at the time of closure, when just what is to be printed is his locus of attention, when closure demands that something be done, and when the fact that there is noun-verb design means that the act comes last. In general, the HIOS uses this method, improving upon it by using the command mechanism described above rather than dialog boxes. Of course, in this particular example, in the HIOS one is always printing a selection, but the principle applies elsewhere.

Searching

Further reduction in mode errors and a greater unity can be obtained by unifying cursor motion in text, searching the local system, and searching over networks. This is accomplished by extending the prior art incremental search methods into a spiral expanding search method. But searching itself in conventional systems violates cognetic principles.

A string is a sequence of characters; ordinary English words and sentences are examples of strings. String searches look through a (usually lengthy) string, called the "text," for an instance of a (usually brief) string that the user specifies, called the "pattern." Each occurrence of a substring of the text that matches the pattern is called a "target." For example, if a user of a computer system wishes to find where the user has written of a cat called Little Tatsu in a long letter stored on the computer system, the user can search for the pattern "Little Tatsu." The user may also chose to use a briefer pattern such as "Tatsu."

A match may be exact; it may be case-independent; or it may represent some other relationship between the pattern and the target—they might rhyme, for example. A commonly used matching criterion is that lowercase letters in the pattern match either uppercase or lowercase letters in the text, but that uppercase characters in the pattern match only uppercase characters in the text. Searches usually start from the current cursor location in a document and continue forward through the text of the document. In most conventional systems, a modal user preference setting can direct the search to proceed backwards through the text.

Interfaces to searches are typically based on one or the other of two search interface strategies. The most common strategy is the delimited search, found in most word processors. In a typical delimited search, the user enters a mode in which typing (or other methods of text input) is regarded not as text but as a pattern. This is usually accomplished by employing a dialog box containing a field into which the user can enter characters. After summoning the dialog box, the user types the pattern, followed by a delimiter, which is usually a character (such as the "return" character) that is not permitted to occur in the pattern. In most dialog boxes, the user may also delimit the pattern by using a graphical input device (such as a mouse) to click a button with a label such as "OK," "Search," "Find," or "Find Next." When a target is found in the text, the target is selected, and the cursor is placed immediately at the beginning of the selection.

The less common conventional search approach is the incremental search, a popular example of which is found in EMACS, an editor used with the UNIX operating system. In most implementations of incremental searches the user first summons a dialog box that contains a field where the user can enter a pattern. When the user types the first character of the pattern, however, the system uses this character alone as a complete pattern, and immediately begins to search for the first instance of that character in the chosen search direction. If an instance of that first character is found before the next character of the pattern is typed, the instance is selected and the cursor placed immediately after the end of the selection. If the next character of the pattern is typed before an instance is found, then that character is added to the pattern and the search continues, now looking for an instance of the now-extended pattern. This method is repeated as each character is added to the pattern.

Deleting a character from an incremental search pattern (using the backspace or delete key) typically returns the search to the previously-found instance that matched the pattern, as it was before the deleted character had been added to the pattern. The user can then add to the pattern, and the search continues without the user losing the search already accomplished on the partial pattern. Such a search, denoted "leap", is described in U.S. Pat. No. 4,806,916, entitled, "Computer display with two-part cursor for indicating loci of operation" and U.S. Pat. No. 5,019,806 entitled "Method and apparatus for control of an electronic display."

Incremental searching has a number of advantages over delimited searching. Incremental searching wastes less of a user's time: The search begins when the first character of the pattern is typed the system does not wait until the pattern is complete. With a delimited search, the computer waits for the user to type the entire pattern and delimit it, after which it is the user who waits while the computer does the search. When using a delimited search the user must guess, beforehand, at how much of a pattern the computer needs to distinguish the desired target from other, similar targets; with an incremental search the user can tell when the user has typed enough to disambiguate the desired instance because the target has appeared on the display. Thus, as soon as the user sees that the user has reached the point desired, the user can stop entering the pattern. If the user types a few too many letters of the pattern (in the case where the hand is quicker than the search), the pattern will still match and the cursor will stay approximately where the user wanted. If the user mistypes a pattern in a delimited search, the user must wait until the search for the incorrect pattern is complete (or, at best, must operate some mechanism for stopping the search) before the user can correct the error. In a large text, the search can take a considerable period of time. In a well-implemented incremental search, the user can backspace at any time and be returned to the last match found. Because backspacing after an error is habitual, the process of correcting an error is very fast, and the search stops immediately. The user can also resume the search by typing the correct character. It is an important cognetic principle that the habits formed when typing or otherwise supplying text are the same whether that input is being made to content or to a search pattern.

Another advantage of an incremental search approach is that, as the user enters the pattern, the system provides constant feedback as to the results of the search. With a delimited search, the user does not find out if the pattern is suitable (or even if the pattern was typed correctly) until the pattern is fully entered and a search attempt has been made.

Almost all conventional interface-building tools (such as the JAVASCRIPT® and VISUAL BASIC® tools) make it easy to implement delimited searches and difficult or impossible to implement incremental searches.

Building a pattern incrementally allows the user to adjust the pattern interactively during the search, which leads the user to improve the user's search strategies through the feedback received. Even building a Boolean search pattern is made more effective when the early results of the pattern appear as the user adds to the pattern's specificity.

If an instance of the pattern does not occur in the text, then the search fails. Many conventional systems cease operating in this event, and remain unusable until a particular key—typically enter or return—is pressed or a particular on-screen button is clicked. A modal message is placed on the display to let the user know that the user must make the required obeisance before he or she will be allowed to continue using the computer. In multi-display systems, or if the screen is visually busy, this message may be nowhere near the user's locus of attention. The user may not notice the message at all. It then seems to the user that the computer will not respond to the keyboard; it will seem to the user as if the system has crashed. In an incremental search, it is clear, without any special indication, that a search has failed; the cursor returns to its original location and additional keystrokes do not have any effect. This turns out to be a good indication that the search has failed.

Another drawback of delimited searches is that the delimiter that is used to end the pattern cannot be typed into the pattern. Often, other delimiters are excluded as well. For example, conventional word processors may not allow a return in a search pattern at all, may require the user to enter a special string such as "^r" or "\\", or may require the user to use a special dialog box with a pulldown menu of delimiters. In a quasimodal search, any character that can be typed or entered can be part of a pattern without the user having to learn a special method for inserting that character into the pattern.

Spiral Searching

In conventional GUIs, both delimited and incremental searches are initiated modally by means of a dialog box. At least one prior incremental search techniques, referred to here as LEAP™ searching, is modeless. In one implementation of LEAP searching, there are two LEAP keys included on the keyboard used by the system, one of which searches forward from the present position in the document, and one of which searches backwards. Pressing a LEAP key puts the user into a quasimode; once in this quasimode, the user can enter a pattern. In another implementation, the search quasimode is signaled by holding down a button on a microphone while the pattern is given vocally. Most of this discussion has been in terms of the most common use of searching, that is, with keyboard input, however the principles hold with other forms of input. For example, the search quasimode can also be established vocally.

With conventional delimited and incremental searches, when a pattern is not found in a specified document or group of documents, the search terminates. A message or sound is often given to indicate that the pattern was not found, however, in accordance with the principles state here, the message should not establish a mode. Spiral searching can be implemented using voice control technology. For example, a microphone can be provided having a switch, such as a spring-loaded, return to center rocker switch that can be set to one position to initiate a forward search and to a second position to initiate a backwards search. After the user speaks a character of the search pattern, the character is added to the current search pattern and a search of the current search domain is initiated. Alternatively, the search can be initiated after the user has spoken an entire search pattern, either character-by-character or as whole words or a phrase. Whenever a matching target is located, the matching target can be displayed and/or audibly indicated to user (for example, by having the system say the sentence in which the target was found).

An expanding spiral process can also be used to search the World Wide Web. For example, a user can initiate a search that proceeds circularly through an initial web site. Then, the search proceeds to search related web sites (for example, as defined by a web-categorizing service such as YAHOO!® or GOOGLE™) until the search has searched the user's own machine and the entire largest network to which the user is attached.

Visibility

Whether a product is a handheld two-way radio or a computer's desktop, it is not always clear what functions are available, what they do, or how they are accessed. A user should be able to use her senses to easily discover both what abilities are available and how they are to be operated.

An interface feature is "visible" if it either is currently accessible to a human sense organ (usually the eyes, although this discussion applies also to other sensory modalities) or was so recently perceived that it has not yet faded from short term memory. If a feature is not visible, it is said to be "invisible." If an interface forces the user to memorize the fact that a feature exists, then that feature is invisible. If the user is forced to root around in the interface until, by luck and perseverance, he comes upon a sequence of actions that activates a feature, then such a feature is not visible. If one has to use a help system to discover how to perform an operation, then the controls for that operation are invisible. Many computer games are, essentially, undocumented interfaces in which the controls or their mapping to desired effects, are invisible. Add documentation and these games become trivial. Most people do not want to play games when they are trying to get work done. It is, therefore, up to the designer of an interface to make every feature of a product visible.

In conventional systems when an object is moved between a first and a second location which are not both displayed (and sometimes even when they are both displayed) it is often necessary to begin by removing the object from its first location, whereupon it resides in an invisible "buffer". One must then move the cursor to the second location and use a command that places the contents of the buffer at that location. If the user is interrupted or forgets for some other reason that an object is in the buffer and tries to move a second object, the first object can be lost, primarily because it is not visible. In the invention, an object is moved without its being invisible at any time or the system ever being in mode where it can be lost. The method is as described for exchanging objects in the section on "selection" except that a "move" command rather than an "exchange" command is given.

In designing to accommodate visibility, each function and the method of operating it would be apparent (to most people in the culture for which it is intended) by merely looking at it. A control that has this attribute has come to be called an "affordance." If a knob such as is used in volume controls is placed on a product, people will attempt to turn it. If something that looks like a pushbutton is provided, people will push it. Whether a feature is or is not an affordance depends on the experience and background of the people who will be using the product, and the context in which the feature appears.

One problem that combines the problems of modes and a lack of visibility in conventional interfaces are "dialog boxes", also called "message boxes". These allow the system to communicate warnings to and ask questions of a user. While in general their use should be avoided as they interrupt the user, there are some circumstances in which they may be useful. Typically, a message box is a rectangular user interface element in which text and/or graphics are displayed along with a user interface control (such as button). The user must actuate the user interface control in order to dismiss (that is, remove from the display) the message box. Such message boxes are typically "opaque." In other words, when a conventional message box is displayed on a display of a computer, the message typically obscures the user's view of at least a portion of what was previously displayed. Also, the user typically cannot perform any other operation with the system or the application that generated the message box until the user dismisses the message box by actuating the user interface control. Thus the usual gestures do not work, often surprising the user, but in any case potentially leading to mode errors. For example, word processors typically include a "find" command that a user can invoke to search for a string of characters in an open document. Typically, if the word processor is unable to find the string in the document, the word processor will display a message box to that effect. Such a message box typically includes message text (for example, "Word has finished searching the document. The search item was not found.") and a user interface control (for example, an "OK" button) for dismissing the message box. Once such a message box is displayed, the user typically cannot continue editing the open document until the user has dismissed the message box by clicking on the "OK" button (or using a keyboard equivalent to clicking on the "OK" button). Also, it can happen that the box obscures the very item the user was seeking to find.

Another common operation that conventional interfaces perform is eliciting a response or information from a user. One conventional approach to doing this is to display a "dialog box." A dialog box is similar to a message box in that a dialog box typically displays text and/or graphics. The text and/or graphic, however, typically elicits some sort of response from the user. For example, the text may ask the user a question or request that the user enter some information. Such a dialog box typically includes one or more user interface controls (for example, buttons, check boxes, selection lists, and/or text fields) that the user can manipulate in order to provide a response to the system. For example, such a dialog box may include a text field into which the user can type information or a button on which the user can click in order to respond to a question.

As with message boxes, dialog boxes are typically opaque and require the user to actuate one of the user interface controls (or use a keyboard equivalent) in order to dismiss the dialog box and continue working. For example, a common feature included in conventional word processors is the ability to check the spelling of a set of words selected from a document. After checking the spelling of the selected words, it is common for the word processor to display a dialog box informing the user that the word processor has finished checking the selected words and asking the user if the user would like to continue checking spelling in the rest of the document. The dialog box typically contains two buttons—one labeled "YES" and one labeled "NO." The user can click on the "YES" button to command the word processor to check spelling in the rest of the document or click on the "NO" button to dismiss the dialog box without checking the rest of the document. Also, when the system detects what it perceives to be a misspelled word, the system typically displays an opaque dialog box notifying the user of that fact and prompts the user to indicate if (and how) the user would like to correct the flagged word. However, to know whether the spelling of the flagged word is correct, the user may need to see the context in which the word appears, for example, to determine if the word "their" or "there" should be used. If the opaque dialog box happens to be displayed so as to cover up the context in which the flagged word appears in the document, the user must first dismiss the dialog box and then fix the error manually.

Thus, with conventional opaque message boxes and dialog boxes, at least a portion of the display is typically obscured by the message or dialog box. Also, the user typically must take some additional action—beyond merely continuing to do what the user was doing before the box was displayed—to dismiss the message or dialog box. The transparent message box solves most of these problems by allowing the user to both see and to click on items that are visually "beneath" the scrim-like message. The operation of the system does not change, and the user is not in a mode. In addition, less of, or none of, the existing view is rendered invisible. In the HIOS, the content of all such messages are, in any case, stored. Once the user has clicked on a message box button, clicked through it, or otherwise continued to work, the message box can disappear either all at once, or gradually, or vanish in some other manner that would be apparent to anybody skilled in interface design or animation arts.

Abolition of the Desktop

A metaphor that permeates personal computers (and derivative technologies) is that there is a central, neutral dispatch area, or desktop, from which the user can launch a variety of applications. When computers are turned on, most of them present the desktop, although some of them can be set to launch a fixed set of applications. When the user quits an application, he is usually returned to the desktop. This interface strategy is inefficient. The reason is straightforward: In current, desktop-based, systems the user must always navigate to the task, however if the user was always placed in a task, preferably being returned to the last task he was involved with, then in those cases (which are often in the majority) where he wishes to return to the task, no navigation (with its attendant effort and time) is required. If the user has to invoke a different task, this is no worse than the desktop method. Thus, in the worst case, the method of not returning to the desktop is no worse than the desktop, and in all other cases it is better. Also, observe that the users tasks do not get accomplished in present art desktops, but in applications. Time spent at the desktop level in present art systems is overhead, and its elimination increases productivity. The desktop is logically and technologically unnecessary.

Eliminating Conventional File Names/File Structure

Aside from the real limits of the hardware, the interface in accordance with the invention is implemented to minimize fixed length limits. Techniques such as dynamic memory allocation, hashing, and others are available to the designer of ordinary skill to avoid software implementation limitations.

This consideration applies to the concept of file names. From the user's perspective, a file name is just a handle with which to grab a file. Long experience in the computer arts has taught that file names do not work as one would expect; they are an impediment when the user wants to save and near to futile when the user wants to find. File names are bothersome when the user is about to save work because the user has to stop in the middle of his activity, which is trying to store work away, and invent a file name. Creating names is an onerous task: the user is required to invent, on the spot and in a few moments, a name that is unique, memorable, and fits within the naming conventions of the system being used. Furthermore, at that moment, the question of a file name is not the locus of attention: preserving the work is. File names are also a nuisance when one has to retrieve a file. The name thought up was probably not particularly memorable, and probably forgotten after a few weeks (or less).

Having to name files increases the mental burden on the user. Giving a file a name does nothing more than to add a few characters to the file, and the user is required to remember the file by that one tiny portion and by nothing else. This is one of the major horrors visited upon users by conventional computer systems. Many information appliances have also adopted this methodology.

In the invention, there is no distinction between a file name and a file. A human mind can more effectively use a fast, whole-text search engine, so that any word or phrase from the file can serve as a key to it. An unlimited-length file name is a file. The content of a text file is its own best name.

Graphics and sound files do often require names, but as explained below, improved navigation as provided in the invention's use of a zooming interface avoids the memory burden that traditional file structures impose for non-text files. Aside from non-text files, given a fast whole-text search, file names—one whole species of unnecessary entities can be eliminated. With the removal of file names go all the mechanisms for dealing with file names, such as directories of file names, rules for editing file names, and syntactic restrictions on file names. When file names are eliminated, a significant mental burden and much internal machinery—machinery that is currently part of what the user has to learn and what programmers have to implement—vanishes.

For users who insist on a system that looks like conventional file structures, there can be a command that creates an "information document" or an extra page at the end of each document when the document is selected and the command applied. The information document or page contains information such as the date and time the document was created or modified; a revision history; the length of the first document; or other information of value. The preferred implementation of this command acquires and stores the necessary information automatically for the user. A command is optionally provided for retrieving this information.

Another source of organization, one that is easier to learn and to use than traditional file systems, comes from the inherent hierarchical structure of many natural languages: Words are separated by spaces. Sentences—sequences of words—are separated by one of a small number of delimiters, followed by a space (in English, these delimiters include periods, question marks, and exclamation points). Paragraphs—sequences of sentences—are separated by at least one explicit return character. Explicit page characters (page breaks) separate chapters (or whatever a user wishes to call the next level of organization).

In the system in accordance with the invention, page breaks are treated as characters and, unlike in most conventional systems, they behave—in terms of insertion, deletion, and searching—just as any other characters do. As with return characters, there may be implicit page breaks to accommodate the fixed length of physical pages, but these are not part of the content.

The system of the invention does not stop here in the hierarchy as many conventional systems do. Documents are organized as a sequence of pages separated by document characters, each of which is typable, searchable, and deletable just as was any other character. In various implementations, higher delimiters, such as folder and volume characters, and even further ones, such as section and library delimiters (one can elaborate endlessly in this way) may be provided. For example, a set of two consecutive document characters makes a fine delimiter for sets of documents. If more levels of organization are needed, three or four consecutive document characters could be used as delimiters. It can be easier to repeatedly tap the document key, even four times, than to type such rarely-used keys as folder, volume, and library. This convention also prevents an explosion of new keys on the keyboard; it is important for all delimiter characters to have dedicated keys, for otherwise, they would not behave as do all other typable characters.

Because the various separator characters behaved exactly as do all other characters, there is no need to teach users how to do searches for them. If an individual insists on having explicit document names, he can adopt the personal convention of placing the desired names immediately following document characters. To find a document with the name Dogs of Asia, the user would search for a string that began with a document character followed by Dogs of Asia. Such a search would ignore all instances of Dogs of Asia except for those used as document names. If the user wanted a directory, there could be a command that would assemble a document comprising all instances of strings consisting of a document character, followed by any other characters, up to and including the first return or higher delimiter.

Eliminating hierarchical file structures does not mean that the user has to give up structuring his stored information. There is nothing that prevents the user from creating tables of contents and indexes, or putting all his letters to Uncle Albert and Aunt Agatha on consecutive pages. There is nothing to prevent the user from even putting a heading page (just another document), labeled "Letters to Uncle Albert and Aunt Agatha," in front of them. If that is done, the user has created, in effect, a file name, but without the requirement of a special mechanism in the software. The user can create, if wished, a hierarchical file structure of his own devising. Structure, as the user chooses to create it, is part of his content, not part of the interface. Instead of a file-finding facility, the user simply employs the general search mechanism to find the file names he has created.

With the system in accordance with the invention, the user can place a folder name as a document in front of a number of collected files; can place a volume name in front of a bunch of collected folders. (The pattern would be a volume-character, followed by the name of the volume—such a pattern would eliminate matches to other occurrences of the name that happen not to be labels of volumes). The absence of a built-in file organization does not prevent the user from creating a file that fits his individual needs, and one that, because the user created it, he understands. But also, because the system has not been changed in any way, a guest can find things in the user's structure (in fact, she can ignore the structure and treat all content as a flat, unstructured, file).

One advantage of filing information in the manner of the invention is that the structures were not dictated by the designers of the particular implementation of the system—who may have ideas different from the user's. Therefore, the user does not have to develop a mental model of what the designers were trying to do. Many users do develop inaccurate models of how systems work; these mental models persist and cause continuing difficulties for those users.

A similar feature as described herein was provided on the SwyftWare and Canon Cat products. In those cases, the elimination of file names, directories, and the various mechanisms usually provided for manipulating them proved one of their most successful features.

One benefit of eliminating file structures can be seen in the implementation of a copy command. Consider the case where the user has n documents that he wants to copy to an external medium, such as a FireWire hard drive. With, for example, the Macintosh OS, the user drags the icon of each document to the icon of the drive, and it is copied. In the new paradigm it seems, at first, more complicated: the user has to find the beginning and the end of each document, select the document, and move the cursor to a place on the drive, and then move each document.

However, in the GUI, the user starts in the generating application. The first step is to get to the desktop. The user must also remember which icons correspond to the desired documents, and someone had to have gone through the steps of naming those documents. The user will have to also know in which folder they are stored. So the apparent simplicity is only arrived at after considerable work has been done and the user has shouldered a number of mental burdens. Assuming (as was done for the GUI) that the cursor is in one of the documents the user wishes to move, then selecting a document with an especially efficient cursor moving technique (for example, a prior art method called LEAP explained below) consists of only a few keystrokes.

The prior art LEAP system, which is particularly useful in the system in accordance with the invention, works like this: There are two LEAP keys, one of which searches forward from the present position, and one of which searches backwards. Pressing a LEAP key puts the system into a quasi-mode; once in this mode, the user can enter a pattern. In this case, the pattern would be a single document character. Typing the document character in the LEAP quasimode moved the cursor to the document character. The next LEAP moved the cursor to the other end of the document. A tap of both LEAP keys together selects the text. (This is probably most easily done when the LEAP keys are operated by the thumbs, which are otherwise underutilized in typing. A dedicated select key is another alternative.) In order that the function be visible, a legend adjacent to the LEAP keys is needed. The legend could, for example, read "Press both LEAP keys together to make a selection." Note that the user does not have to watch the display while he selects the document. Once a document is selected, the cursor is LEAPed to some target in the contents of the drive (the contents of which, when the drive was plugged into the computer, became simply part of the contents of the system) and a COPY command is given. The document, when selected this way, includes its separators. Thus, if the document is moved, it retains its character as a document because the document separators move with it.

The same technique that is used to copy a document (or a selection of any length from a character to a set of documents—or the entire contents of the system) from here to there is used to move a selection; the only difference is that a MOVE command rather than a COPY command is given. The process is functionally no more complex than that needed in the GUI. It will often be faster; and the number of methods, concepts, and structures that an individual must understand is lower.

Putting a few selections from different documents together onto a drive using the LEAP-based paradigm, employs the same method as that just described for moving documents to the drive: The selections are found (and once found, do not have to be opened, because the concept of opening a document is superfluous); selected, as described above (except using the text—rather than document characters—at the beginning and end of the selection); and copied into place. In a GUI, the user must first open a new destination document (possibly by using the NEW command in the FILE menu of the application); find a document that contains a selection the user needs; open the document; find the selection within the document; select it; use the COPY command; activate the destination document; PASTE the selection in; activate the desktop; find the next document that has a desired selection; and repeat until all the selections have been pasted into the destination document. Then he must SAVE the result to the drive by using a dialog box.

Even if the complexity of doing any task was the same in either paradigm, the conceptual simplicity of the methods outlined here would be preferable. In most cases, the work required is also far less.

Abolition of Applications

The conventional structure of computer software, consisting of an operating system under which application programs execute, is inherently modal. This has suggested to the inventor that to develop an interface that is nonmodal, an approach that does not include applications in their conventional form be used.

Because gestures (for example, those that invoke commands) in one application may not be available in another, the user must be conscious of which application is currently active. But the user cannot reliably do this when his locus of attention is the task he is trying to accomplish. The user will sometimes use a gesture with either no result or the incorrect result. A separate difficulty caused by application programs is the unavailability of the facilities of one application when the user is in another. For example, the user wishes to do a task that could have done in application A, but the user is in application B, which has no comparable command.

Three approaches at solving this dilemma are well known. The most common method is to provide, in each application, all those facilities the user is likely to need. This was discussed above, where it was pointed out that every personal computer has many different text editors, each part of some application or other facility. Most personal computer word processors have multiple and different text editors in its various parts (for example, a typical word processor has a weaker editor when typing a pattern into the Find dialog box than when working in the main body of the text). This approach forces applications to become gargantuan, as each of them must solve a host of user needs that are peripheral to the primary thrust of the software. For example, some word processors have an embedded drawing program so that the user can create simple illustrations without having to leave the text editor. At the same time, drawing programs have embedded text editors so that a user can include formatted blocks of text in drawings without having to leave the drawing program. The drawing facilities in the editor and the text editing facilities in the drawing program are typically inferior to the software primarily dedicated to those tasks. Ideally, all the commands and abilities of both the drawing and the editing program should be available at all times.

Similarly, every program has facilities for saving and retrieving named files. However, these facilities operate differently and have different features in different programs. This is confusing, difficult to operate, and also requires immense amounts of largely redundant software, all of which the user must pay for, learn to use, keep the documentation for, and for which the user must supply a computer system with adequate main memory and mass storage. The same is true of a host of other features that are duplicated or nearly duplicated between programs.

There has been some industry recognition of these difficulties; a number of companies designed software that permits a single compound document to have parts created by different applications. When the user clicks at any point in a compound document, the application that created that portion of the document becomes active. Once the compound document has been created, this technique allows the user to avoid having to open the individual applications explicitly. Of course, to create such a document the user must still manually invoke the applications, create the parts of the compound document, and then assemble them (usually by cutting and pasting, or by dragging). Although providing a modicum of convenience, the fundamental dilemma is not solved by this method, which is exemplified by Apple's OpenDoc, HP's NextWave, and Microsoft's OLE software and their descendants. It remains the case that when the user is working in one part of a compound document he does not have the facilities of the applications used to create the other parts of the document. Worse, the user now has a document that seems to have no boundaries, but whose behavior changes from place to place without warning. A table and a spreadsheet may look identical, but one operates according to the rules of the word processing program, and the other operates according to the rules of the spreadsheet program. This is a particularly troubling form of modality. The only warning the user gets as he clicks here and there is that the menus, which are usually positioned far from the locus of attention, change. This is an ineffective means of alerting a user as to system state (there is, of course, no completely effective means).

The original approach to eliminating the modes inherent in applications was the creation of the windowing paradigm. Overlapping windows were proposed, in part, to eliminate the modality of applications. Windows were also intended to eliminate the distinction between operating system and applications, but succeeded primarily in making the functioning of the operating system visible in the form of the desktop. However, windows do not eliminate the modality of applications but, instead, make multiple applications simultaneously visible and accessible. But the problem of modes and other dilemmas posed by the existence of applications have not been solved. One method of eliminating modality particularly suited to the system in accordance with the invention is to provide a system of universal command execution.

The invention applies the concept that a system should not be more complex than the user's present needs, and by allowing the system to increase its power incrementally, the system can provide products that are initially truly simple without being made to merely look simple, and without impairing their flexibility. To understand one means of doing this, one must recognize that almost all that a computer does involves the content that that the user provides or obtain, and some set of operations he wishes to perform upon this content. The interface to every such operation consists of two part: choosing the content and invoking the operation.

When a command is invoked on a selection, there are three possibilities

The operation can be performed on the selection

It makes no sense to apply that operation to the selection

The selection can be modified to make the operation possible

In the first case, the operation is performed and the content modified. In the second case, the content is left unchanged. In the third case, before the command can be performed, another process must be invoked by the computer to modify the selection.

Instead of a computer's software being viewed as an operating system and a set of applications, the invention views the software as a set of commands, some of which are transformers that can be invoked automatically when the data type expected by the command does not match the data type of the object selected. More than one transformer may have to be invoked. For example, given a computer with one transformer that converts A to B and another that converts B to C, and if the command expects data type C but the data type of the selection is A, then both transformers will have to be applied before the command can be carried out. And, in the case where there are no transformers available to do the job, no change is made to the selection; the user is informed if necessary, and the selection is left unmodified.

Instead of relying on application programs, command sets that offer a collection of related operations are provided. For example, instead of a program for doing photographic manipulation, a number of independent commands are provided that, collectively, provide exactly the same range of operations. The user can install as many or as few of these commands as she finds useful, rather than having to install a huge application (of which only a fraction would be used).

Various surveys report a range for the amount of typical software application features that are never used. The numbers have tended to rise over the last decade, and have increased over that time from about 15% to the latest surveys nearing 50%. That is a lot of clutter. By providing command sets—each command of which can be installed independently—instead of applications, individual users can drive that statistic to nearly zero. Other advantages in this methodology are the ability to refine software products incrementally, and to provide new features more easily and frequently. In addition, transformers can be sold individually to meet the user's needs. For example, if a majority of users regularly employ most of the word processing commands from vendor A, and vendor B thinks of a useful command that A does not provide, then B can sell that command to A's customers. However, B might use a different data structure. In that case, B would be wise to provide a pair of inverse transformers that go from A's data structure to B's data structure and back again.

Of course, not all programs require this mechanism. A game, for example, would simply be launched and would run independently: This is done in the usual way by clicking on (or selecting) the desired game's name, probably from a text consisting of a list of names of games, and then using the execute command.

A desktop-based interface has a very low efficiency because the user does not accomplish tasks when in the desktop. The system in accordance with the invention has neither desktop nor applications and leaves the user involved with content at all times.

As explained above, the invention eliminates files and file names, so that there is only one universe or content space. The user does not need to open or close documents, he simply zooms to them (as explained below) or LEAPs to them and starts working. The user does not open applications, but can create a new work by just duplicating a blank document; he does not launch a game, but zooms in on it (a multi-user game may even be in progress). Separation into user—defined content areas employs the separators from the character set, user-chosen words or codes, or by making positional distinctions.

E-Mail Example

Transmitting e-mail is a separate application in most systems. In an implementation of the system in accordance with the invention, sending e-mail consists of selecting the text, selecting the address, and executing a send command. Because nearly every operation begins by making a selection and ends by executing a command, the standard sequence of operations becomes habitual, and the operation of sending e-mail does not feel like three distinct steps, but only one.

The user's e-mail directory is simply his address list, or any list containing names and e-mail addresses. It is just ordinary text, not a special mechanism. If the user wants to send an e-mail to his uncle Herman, he starts by typing the note, and selecting it. The user then LEAPs (or navigates in another fashion) to Herman Jackson (or however the uncle is listed) and then selects his e-mail address. Lastly, the user types (or selects from a list of commands) the Send command and executes it with the command key. Instead of a single name, of course, the user could have selected a list of names for an email broadcast. Another approach is to have an e-mail command use the first line of the selection as an address, the second line as the subject heading, and the remainder as the content of the message. A command can also be used for making a selection an attachment to an e-mail.

One implementation of the invention also treats receiving email differently from current systems. When an e-mail arrives, two document characters, which sandwich the growing contents of the e-mail, are inserted immediately before the user's current cursor location. The user can, of course, continue to work as the e-mail streams in. No special window or "You have mail" message is needed. The user can ignore the e-mail or read it in progress. At any time, during transmission or afterward, the user can select the e-mail, then can move it to wherever he wishes. An experienced user is likely to have a spot labeled "E-mail Repository", "E-mail Goes Here" or some such so that it can be LEAPed to, and the e-mail (deposited there automatically as well as being presented at the focus as it arrived) can be read at leisure. The value is that the e-mail, with any attachments, comes in automatically and visibly, and becomes part of the user's text; the user already knows how to move text to where he wants it. Attachments download in the background so that work is not interrupted and that, if there is fear of software viruses, can be placed into a non-executable software quarantine. In another implementation, the arrival of an e-mail may be announced in a transparent message box and the incoming message can appear as part of a certain document.

A command that gathers recently received e-mail and puts it into a particular area in the user's content universe may optionally be provided in an implementation of the invention.

Any abilities now provided by applications also fit into the same model. Consider spreadsheets: If a selection has the syntax of an algebraic expression, and if a Calculate command is executed, the expression is stored and the results of the expression are displayed in its place. Another command reverses the process and shows the stored expression, which, if necessary, can be edited and recalculated. If expressions are permitted to have variables, if values can be given names, if a syntax that allows position-relative references is provided, if there is some notation for ranges, and if the expressions are put into a table, then a fully functional spreadsheet has been created. But it is more than just a spreadsheet, because references to the spreadsheet values can be incorporated anywhere in text, and any value in the text can be incorporated, by name, in the spreadsheet. That is, the results from a spreadsheet in a report can be used in the introduction to the report, and values in the text can be used in the spreadsheet—without having to set up any special mechanisms. There are no sharp demarcations between text, mail, and spreadsheets (or, for that matter, any other content). Commands can be supplied to limit the scope of variables (as in spreadsheets) to within a selected region to avoid variable name conflict and similar problems. It can be seen that programming consists of text editing along with a command (for example: compile) that tells the system to treat the text as code. The HIOS can be, and in some implementations is, its own programming environment.

In the prior art, different applications have different commands, and a user cannot in general use the commands from application A while working in application B and vice versa. The invention liberates commands from applications and the inherent modality of applications is eliminated. Applications are replaced by collections of commands, each of which is available at any time. The total number of commands a user must master drops dramatically with this kind of unification, primarily because unification rids the system of the immense duplication of commands exhibited by conventional systems. In a system constructed in accordance with the invention, the thousands of commands now provided to computer users by prior art systems is reduced to the hundreds. Because not all commands apply to all data types, data-type transformers are applied to objects to create new objects that, when possible, can be acted on by the chosen command. A discussion appears below.

Another distinction that can be erased by use of another aspect of the invention is the distinction between certain facilities provided, in prior art systems, by commercial software and by the user. For example, menus are, at present, operating system objects that are set up by each application, and which are generally set up by the programmers who design a system. However, they are just text. The invention allows ordinary text that happens to spell (or was deliberately created so as to spell) the name of a command to be selected and used as a command just as if that command were invoked by a click on a menu as in conventional systems. Additionally, the command can be typed while in a command quasimode, that is, while a "command" key is pressed and held much as a shift key is pressed and held to create uppercase characters. A command so typed can be automatically deleted as soon as it is executed so that it does not clutter the area in which it was typed. This invention permits commands to be used at any time and place where typing is allowed, without the necessity of a dedicated "command line". The user also is freed from the present art necessity of moving their hand from keyboard to GID in order to invoke commands as in menu-based systems. Because the typed command is identical to that appearing in a list of commands (or even in a normal menu), it is easy to learn, no special "keyboard shortcut" that is different than the name of the command has to be memorized.

Grouping is a technique where a number of graphic objects are placed into a set such that selecting any one of them selects them all. In the invention this concept is extended beyond prior art grouping to include text objects. Grouping is also extended to include group indication as well as selection. Grouping is invoked by selecting the set of objects to be grouped and then applying the appropriate command.

A useful interface feature allows a developer (or any user) to type up a list of commands, select and group the letters of each command so that they are treated as one unit, and then, optionally, lock one or more of the commands so that they do not get changed accidentally—lock is a command which can be applied to a selection which thereafter cannot be changed unless selected and an unlock command applied. It is also possible to provide commands that lock selections with a password so that they cannot be unlocked without a password. Commands thus treated can be indicated or selected and a tap of a command key can cause them to be executed. Positioned at the top of the display, they can act as do conventional system-provided menus. Thus this represents a more general and powerful method of presenting commands than do conventional methods, whether menus, shortcuts, or command line codes.

At times it is useful for an object to be static with respect to the borders of the display. In prior art systems a system facility sometimes is used to create a screen background, such as a favorite photo or illustration. In the invention, a command, invoked as is any other command, is used to pin a selection in place with respect to the display area itself. Another typical use for the "pin" command is to create a menu bar at the top of a display. A set of command names that are grouped, locked, and pinned can act precisely as do prior art menus, however they can be readily created and modified at the content rather than the system level. A password version of these commands can make accidental changes to such a menu unlikely.

Another aspect of the simplification of the interface is elimination of difficult-to-remember and annoying-to-create file names and system-provided file structures. If a user is given suitable search mechanisms, he will find both the file names and the provided file structures unnecessary. Finally, the current paradigm of an operating system plus application programs may be eliminated completely, resulting in a unified software approach.

Affordances

It is advantageous in an interface that any objects that look the same are the same. Insisting on this principle results in a boon of simplicity for user and programmer alike, and is a concept that extends far beyond text. Every object for which this can be done is an affordance. If a user cannot tell what he may and may not do with an on-screen object by looking at it, then the interface fails to meet the criterion of visibility, as discussed above.

The ideal of having appearance invariably indicate function is not, in general, achievable. For example, one object can mimic or spoof another. A bitmap of text looks exactly like text, but—in current systems—text-editing operations fail on bitmaps. This kind of problem can be partially surmounted if the system always attempts to transform the object into a type to which the operation applies.

Use of Icons

Icons are the familiar little pictures that are used in current computer systems to identify buttons and other objects. Icons contribute to visual attractiveness of an interface, and—under the appropriate circumstances—can contribute to clarity: however, the failings of icons have become clearer with time. For example, both the Macintosh® and Windows® 95 operating systems now provide aids to explain icons: When a user points at the icon a small text box appears that tells the user what the icon stands for. Instead of icons explaining, it has been found that icons often require explanation. If one wanted to obscure or encode some idea to keep it from prying eyes, substituting icons for the words might not be a bad start. The problem with icons can be considered an issue of diminished visibility: The interface presents an icon, but the meaning of the icon is not visible, or it may give the wrong message to someone for whom the graphic is unfamiliar or has a different interpretation.

In the preface to The Icon Book, author William Horton says, "I've used systems with graphical user interfaces for a decade and would prefer to click on an understandable image than to enter technojargon commands—even if I could remember how to spell them" (Horton 1994). Of the two poor choices he presents, icons may be preferable, especially for the newcomer or the occasional user. However, there is a choice that he omits: Clicking on a button identified by a well-chosen word or two. Bob Horn (Jacobson 1999) has developed a style of combining the attributes of words and icons into combined symbols which reinforces the dictum that text is often the best visual cue. People are experts at visually differentiating one word from another and words can convey quite specific content. Ergonomic factors, such as case, font-size, color, and other attributes of the text are also important.

Icons are most effective when there are few of them (at most a dozen) and when few are seen at one time (again, at most a dozen). In addition it is essential that they are visually distinct, do a good job of representing the appropriate concept, and are presented at a reasonably large size (typically larger than a text label would be).

There are, of course, many places where words fail. A color palette is such an example. The index for a collection of clip art is often effective when it has thumbnail representations of each image, but the list of categories of images, or any higher level organization, should be text. An image of a number of flowers does not convey the same information as the word "flowers". The image might represent "summer", "a listing of florists", or "hay fever sufferers chat room".

Using icons also prevents designers from seeing the possibility of direct manipulation. To discard a document in most GUIs, the user drags its icon to the wastebasket or trashcan. If the document is visible at the time, why not drag the document itself? In a case like this, the icon is an unnecessary proxy and a level of abstraction the user must learn and understand. An implementation of the invention does even better and avoids having a trash icon altogether by making the operation of delete simply a selection of the document to be erased followed by a tap of the delete key. This has the added benefit of making deleting a document monotonous with other forms of deletion.

Providing User Help

An interface in accordance with the invention, as far as is possible, is self—teaching. This does not mean that an interface is, or can be, intuitive, but that a user can readily find comprehensible explanations or instructions when she needs them. To facilitate learning, a display of instructional text is presented the first time a new product is activated. A tutorial and the complete reference should be part of the interface, accessible at any time. Help displays are simply part of the content. No special mechanisms or techniques are required to use them. A LEAP to any keyword (and perhaps a few taps of a LEAP AGAIN key) will suffice to find the desired information. Alternately, the user can zoom to a help area, and then into the particular portion he needs. Help systems in GUIs are, in contrast, an addition to the rest of the interface, have their own rules and implementation, which are an additional burden on the user and on the system's implementers.

Navigation

Navigation, as used herein, is the process of bringing into view on a display, or into earshot or into other detectable form, information in the system (which includes information available to it via any network via direct physical connection or connected by wireless or other means).

In conventional systems many means of navigation are used, which presents a burden on the user. In the HIOS there are two basic navigation methods. One of which has already been described, that is, by means of a quasimodal search such as LEAP. Another is by use of zooming. It is another object of the present invention to make use of improved means of navigating through the user's content in addition to text searching methods.

One means of navigation particularly suited to the invention is referred to as a "zooming user interface" (ZUI). In many situations, ZUIs solve the navigation problem and also provide a way around the problem of the limited screen real estate that any real display system must confront. Although ZUIs themselves are not new, various novel features of such interfaces are useful in the system in accordance with the invention.

In general, the ZUI is based on the idea that the user has access to an infinite plane of information, a plane that has effectively infinite resolution. The plane is referred to herein as "ZoomWorld." Everything the user can access is displayed somewhere on ZoomWorld, whether it is on the user's own computer, on a local network to which that computer is attached, or on a network of networks such as the Internet.

To see more of ZoomWorld, the user can "fly" higher and higher above it. To look at a particular item, the user can "dive" down to it. ZoomWorld also has a content searching mechanism. The overall metaphor is one of flying, climbing to zoom out, and diving to zoom in. The user navigates both by flying above ZoomWorld and by doing content searches.

The ZUI readily permits labels to be attached to images and to collections of images yet does not impose any structure, hierarchical or otherwise, beyond association due to proximity. Users are able to organize collections of images into clusters and some will create informal hierarchies, for example a large heading Personal Photos might, when zoomed in on, reveal smaller headings on groups of pictures labeled Baby Pictures, Vacations, Pets, Hobbies, Friends, Relatives, and so forth. Zooming in to the writing under the heading Baby Pictures might reveal the children's names. A professional photographer is likely to have a very carefully constructed and organized collection. Note that the user is not required to remember the names, he finds them as he zooms and glides about and decides if the image he wants is likely to be in the named category. The same can be done with films and collections of sound, though the user may have to activate a film or a sound to make sure it is the one the user wants. In another implementation, a frame of the film, when zoomed into, automatically begins to play as soon as it is large enough for comfortable viewing. To stop playing a control or command can be provided, but in the preferred implementation, merely zooming away would stop it, so that upon returning, the film would resume from where it left off. A similar method applies to an icon or words representing content that consisted of sounds.

Wherever the zooming controls are located, the point being zoomed in upon is the cursor location, which can be adjusted during the zoom by the graphic input device, being used in its role as a positional pointing device. That is, during zooming, the system moves the ZoomWorld plane so that the cursor position is at or near the center of the display.

If zooming is quick (at least a factor of two in linear dimensions per second) and has the appearance of being continuous, zooming to and from the cursor position suffices as a graphic navigational tool.

In operation, the size of headings and text determines how far in the user has to zoom before details can be seen. This technique substitutes for, and improves upon, hierarchical directories. A fast text search such as LEAP is an important adjunct, used when a user needs to find a textual detail quickly. A few distinctive geometric landmarks can also be used. A large red cross, for example, might signal an area containing emergency medical data.

Users, without having the phenomenon pointed out to them—quickly become familiar with the textures of the kinds of work they do. Spreadsheets, tables, text, bitmapped images, drawings, and other products of computer use each have their own visual characteristics even when seen from afar. The products of various co-workers, groups, vendors, and other creators of material will often be immediately recognizable.

A zooming space gives the user a great deal of flexibility in layout. If a document grows in length or width, it can simply decrease its scale uniformly to make the entire document fit within the same region it did before its content increased. Similar space-making tactics can be used when a table or spreadsheet is enlarged. Because the user can zoom in, the text can always be made large enough to read. The opposite occurs when a document or drawing gets smaller. Blank space is unlimited, if the system is implemented properly; a command allows a new document to be started anywhere, (e.g., by copying a blank document, the ZUI analog of the GUI New command), and documents can be allowed to overlap adjacent documents or be restricted in their growth by them. Internal links and pointers to web sites (URLs) can bring the user immediately to other documents at a place and size determined at the creation of the link. Buttons can have as much information on them as the user wishes, including a complete manual, with examples, without affecting their simplicity when viewed from afar. Every feature can have an explanation built into it without the user having to search or navigate to a different location or open a help window or launch a help facility.

Zooming can also be nonlinear in time, starting more slowly and accelerating to full zoom speed, allowing for fine control of small changes without impeding large changes in scale. It can also slow down and briefly stop at certain predefined zoom ratios, making it easy to get characters to standard sizes.

A ZUI is one means that can replace the browser, the desktop metaphor, and the traditional operating system. Applications disappear. Combined with the other aspects of the invention, a ZUI can simplify the use of computer systems in general. With care and understanding of cognetic principles, it can be built so as to completely conform to the requirements of human cognitive abilities, and is easier to implement, learn, and use than conventional software methods.

Conventional GUIs typically have a mazelike quality in that a user must navigate through various user interface elements such as windows, menus, and dialog boxes in order to access data and to execute commands and applications. For example, conventional GUIs typically require a user to use a browsing application (also referred to as a "file manager") to find files that are located on a computer system and/or network. The browser application typically displays the files in a top-down hierarchy. First, the browser application may display the volumes (also referred to as "drives") that are accessible from the user's computer. The user can then select one of the volumes to "open," for example, by using a graphical input device such as a mouse to double-click on an icon representing the volume. The browser application then typically displays any folders (also referred to as "directories") contained on the volume, for example, by displaying text or an icon identifying the folder. The browser application also typically displays any documents (also referred to as "files") that are stored on the volume outside of a folder. The user can "drill down" further by opening one of the folders, for example, by double-clicking on the icon representing the folder. Any documents and/or folders stored in that folder are then displayed. The user can then open a document, for example, by double-clicking on an icon representing the document or drill down further by opening other folders or volumes. If a document happens to be an application (that is, the document is an executable file), the user can typically execute that program by double-clicking on the application.

Conventional GUIs also typically require the user to navigate through various user interface elements in order to find and execute commands and change settings within applications. For example, typical applications require the user to navigate through one or more layers of menus in order to find and execute commands and changes settings. Often, application settings must be changed by first selecting an item from a menu (for example, the "Tools" menu item) and then selecting an item from a drop-down menu (for example, an "Options . . . " drop-down menu item). Then, the system presents the user with a dialog box containing many separate tabbed pages. Only one of the tabbed pages is entirely visible at any given time; for each of the other pages, only a small tab containing a label describing the page is visible. To view a particular tabbed page, the user can click on the tab. Each tabbed page typically includes several controls such as radio buttons, check boxes, and selection lists that the user can manipulate using the graphical input device (GID), or a keyboard equivalent, to change settings. Often, a user will have trouble remembering where an infrequently used settings is located and, as a result, must spend time searching through various menus and dialogue boxes in order find the desired setting.

Transparent Messages

While a designer should endeavor to create interfaces that do not need to interrupt the user with messages or ask for decisions, there are some times when informing the user is necessary. In present art systems this is done by means of message and dialog boxes. To insure that they are seen, most of these will lock the entire system until the user sends a signal to the system, usually by clicking a button or pressing a key. This is modal and disruptive and can be frustrating when, as in multiple display systems, the message might appear very far from both the locus of attention and the system focus, and the user may flounder for a while trying to find out why the system has stopped working. In addition, the response to such messages often becomes habitual so that the box is dismissed before it has been read, and in general a dismissed dialog box cannot be redisplayed. Error messages also obscure whatever is behind them, which is especially troublesome when the material to which the message refers is thereby rendered inaccessible.

Methods of making one shape appear as if it were transparent and floating above another are well-known and available in commercial software such as Adobe® Photoshop®. However, this ability has typically been used in a decorative and not an essentially functional way.

The HIOS, which may sometimes need to send a message to a user, solves these problems and thereby makes innovative use of transparency by (1) using transparency to avoid obscuring material already displayed, (2) allowing the user to continue to work "through" the message, (3) by storing all transparent messages in a message log so that they can be accessed later and (4) by having them gradually fade from view or otherwise disappear so that the user need take no action to dismiss them. Transparency can sometimes be made more effective by using tints and shading to distinguish it from the background. Transparency can also be used to show material typed or drawn in places where a present art system would have to prohibit such typing or drawing. The user can then use a command to move such typing or drawing to an appropriate location without losing it.

Summary of the Features in the Humane Interface Operating System (HIOS)

An "interface is the sum total of what a user does with a product and how the product responds. Prior art human-machine interfaces have been mostly created in an ad hoc manner. A study of computer science, cognetics, and cognitive psychology suggests that a more unified approach would yield many benefits including ease of learning, ease of use, productivity, reliability, economy, more efficient use of machine resources, and a lowering of the risk of job-related injury.

A number of cognitive principles have been central to developing and understanding this invention, known as the Humane Interface Operating System (HIOS). Among them are the singularity of a human's locus of attention (that humans can pay conscious attention to but one thing at a time), that all other acts are performed at the same time as someone is paying attention to one thing are done unconsciously; and the fact that forming habits cannot be avoided. Another principle is that of visibility; the user either cannot use, must guess, or must burden her memory to use some feature that cannot be seen.

In existing systems, the user is often in a situation where it is not clear what will be selected when the user chooses a point with a graphic input device (GID). The object that is to be selected might be partially obscured, close to another object, overlapping, or otherwise difficult to point to. This is a failure of visibility; what is about to be selected is not visible. However, in the HIOS, the method of indication is available, where what would be selected by a GID always, or nearly always, is shown by a special highlight. No user action beyond pointing with the GID is required for indication.

In existing systems there is, at any time, at most one selection, a design which makes it difficult to collect multiple selections into one and which makes multi-argument commands, such as exchange, impossible to include in any systematic way and without violating cognitive principles. The invention may solve both these problems, and others, by creating a stack of selections, whereby, for example, the current selection and the next most recent selection can be exchanged.

Only three things can be done with an object: it may be indicated, selected, or modified. For example, if a user wishes to change an object's color to red, the user might select the object, which he or she knew was an object due to indication. Then the user might select the color red from a palette of colors, again knowing the extent of the selection by means of indication. Lastly, he or she would invoke a command that takes one selection consisting of a colorable object and one selection consisting of a color (one being the current selection and one being the old selection) and thereupon change the color of the object to red.

A further simplification of current interface paradigms is to create an ontology of kinds of modifications as an ontology of operations was created. The operations turn out to be relatively few in number, and if each category of operation is handled in but one way in the interface, then the number of interface methods can be diminished. The modifications are: generation, deletion, collection, transformation, and replication. As discussed above, and to give an example, replicating an object, say a document, can result in there being two copies of the document on the same system. But printing, emailing, uploading, and saving to mass storage are all ways of replicating a document, and the same method can be used for each: one needs to select the document and the destination, and then apply the replicate command. Note that this method is enabled in the HIOS by there being multiple selections.

In conventional systems, objects that are "owned" by the system are handled differently than content that is "owned" by the user. For example, on the Apple Macintosh system a triangle in a drawing package can be deleted by selecting it and tapping the key marked "delete" ("backspace" on some keyboards), however a document cannot be deleted by selecting its icon and tapping that key (though Windows permits this). In the HIOS, any object may be deleted by selecting it and then tapping the delete key. Similarly, when typing in a word processor, many facilities, such as spell checking are available; however when typing a file name a different set of facilities are available even though typing is the same operation in each case. This leads to confusion and frustration (as when a user wants to check the spelling of a file name). The HIOS has one facility for handling all typing, wherever it might occur. Another feature of the HIOS is that typing does not cause the current selection to be deselected nor does it replace selected text as with most conventional systems. This prevents much accidental loss of text. To replace text, the user selects, deletes, and then types.

Because drag-and-drop (of selections) can be problematical, one of the features of the HIOS that, as is usually the case, is useful in conventional interfaces, is a GID with a special button or other input means that indicates grasping an object, such as buttons on the side of a mouse where they would be operated by a normal grasping motion.

Large systems need many commands, to accommodate them, the HIOS uses command names that may be typed in a command quasimode or selected and then executed by means of a tap of the command quasimode button. Selection of a command is facilitated by grouping the letters so that a single tap of the GID or a LEAP to any part of the command serves to select the entire command. Commands can, where appropriate, be icons or drawings; but they operate no differently than do other commands. Any command may be used at any time (which eliminates modes) if the object selected is not of a type to which the command applies, then the HIOS seeks a facility, called a "transformer" that can convert the data type to one on which the command can operate. An inverse transformer may be able to put the data back in a form where it can be displayed with the original. Because commands can be ordinary text, they can be typed by the expert at a particular command or easily looked up by the novice. The split between ease of learning and expert use of commands is thereby erased in the HIOS, and deep menu searches become unnecessary. Menus can be presented as well-organized documents instead of pull-down lists where many items are obscured.

Universal Undo and Redo are essential to the HIOS, and to a depth that should be limited only by the system's memory size including virtual memory. This is a far better solution to problems such as the accidental erasure of files than the fallible "are you sure" kinds of confirmation.

There should be two means of navigation in a HIOS, though for some applications either one will do; the visual and graphical on one hand and the text-based on the other. They are linked by the invention of spiral incremental searching. Incremental searching gives constant feedback as to how a user is proceeding in his search while the addition of a spiral search pattern may allow searching both locally and globally (including across networks) automatically. A spiral search begins with a wrapped search in the current document, and then proceeds with a wrapped search of ever more inclusive sets of objects. This can be guided by the visual appearance of the environment as seen in the zooming user interface described in "The Humane Interface". The spiral, centered on the user's current focus, can be a literal spiral and the next object to search is the next object the spiral touches as it grows from its center in the graphical representation, or by some other organizing principle that includes the entire domains of interest. Conventional methods separate searches within the user's current document or object from those involving the totality of the user's local system, and use yet a third method for searching on networks (and sometimes there are additional methods). The HIOS unifies all searches, as well as unifying searching with the process of moving a cursor in objects which contain text.

A HIOS minimizes error messages and other messages to the user, however, the invention of transparent messages, so that one can work "through" them and that do not establish a mode improves the usability of an interface even in the presence of such messages.

A central feature of the HIOS is the means and method of eliminating applications per se and unifying all applications into a set of commands. The method of invoking commands via a command quasimode has been discussed, and allows the system to distinguish between content and commands. That commands are as universal as possible is assured by the existence of data type transformers that can automatically change the data type of an object, if possible, if the command cannot apply to it directly. This invention may dramatically decrease the size of the code needed to perform the range of tasks for which a device can be used. It may change a multiplicative explosion of commands into an additive collection.

For some applications it may be advantageous to be able to make selections unchangeable, sometimes with respect to the fixity of their content, at other times with respect to their position on the screen. User-accessible commands that can lock the content of any selection and pinning with respect to the display (as opposed with respect to a window) which allows simulation of conventional system features are not available in current practice.

Implementing the HIOS

FIG. 1 shows a schematic block diagram of one hardware implementation of the invention. System 100 is an information appliance, in this case a personal computer. System 100 includes GID 105, display 110 and keyboard 115 with quasimode keys 120 that may be read simultaneously with one another and with other keys 125 that may or may not be readable simultaneously with each other and with quasimode keys 120, for communicating information to and receiving input from a user. In one implementation, all the keys can act as quasimode keys, in which case the keyboard is a "chord keyboard." GID 105 may be any input device for communicating gestures and/or the position of a cursor on a display such as a mouse, joystick, trackball, touch pad, or other device. Display 110 may be any display device such as a CRT monitor or LCD screen. The information appliance 100 may also be connected to mass storage devices 130, one or more external local area networks 135, one or more wide area networks 140, and to the Internet 145. The HIOS 150 uses input from the input devices to affect the content 30, and uses the content to affect the appearance of the display 110 and transmit information to mass storage or networks in accord with instructions and data received from any source.

Content may be stored in system 100 in any number of ways, including on an internal hard drive, a mass storage device connected to system 100, or may be accessible to system 100 on a local area network (LAN) 135, wide area network (WAN) 140 or even on a global network like the Internet 145 attached to system 100. From the user's point of view, HIOS 150 treats content in the same manner regardless of its physical location or source. When the system focus is on some object of content, the data associated with that content may be loaded into available memory in system 100 (not shown) which may be, for example, random access memory (RAM), to facilitate ease of interaction. Such manipulation, however, is invisible to the user who, as discussed above, simply sees content 30 as a collection of information organized in any manner the user or content provider chooses.

Figure 2:
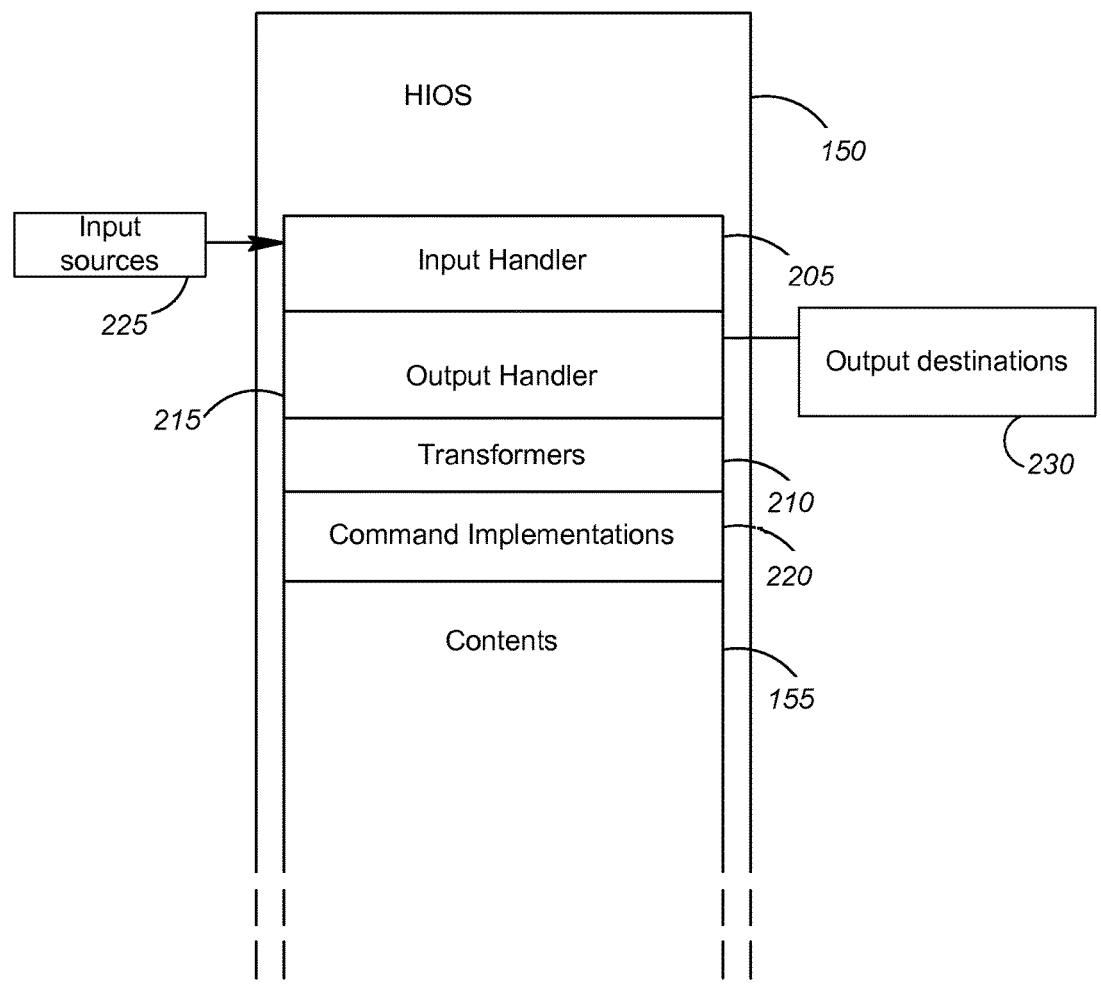
FIG. 2 is a schematic diagram showing the HIOS in accordance with the invention.

As seen in FIG. 2, system 100 also includes transformers 210, which may be in the form of computer program code. Like content 155, transformers 210 may be stored in non-volatile memory in a number of ways such as, for example, on an internal hard drive. A subset of often-used transformers may also be maintained in system memory. In one implementation, system memory contains a list of available transformers and a map of their locations to facilitate their execution. HIOS 150 accesses and executes transformers 210 as needed in response to commands input by the user.

System 100 also includes command implementations 220 which, like transformers 210 may be in the form of computer program code. The elimination of multiple separate application programs, as discussed above, eliminates a tremendous amount of redundancy present in current computer systems. Eliminating this waste makes it possible to maintain large, possibly comprehensive, set of command implementations in RAM or ROM, making operation of the system much faster. As discussed above, the collection of actual commands resident on each user's system may vary depending on the tasks most commonly performed by a particular user. Command implementations 220 are accessed and executed by the HIOS in response to user inputs as discussed above. As with content 155, transformers 210 and command implementations 220 need not all be present within system 100, but may be available to system 100 from any of the sources shown in FIG. 1 or elsewhere.

As shown in FIG. 2, the HIOS 150 which controls content 155, transformers 210, input handler 205, output handler 215, and command implementations 220. The input handler takes in all input sources 225, and the output handler 215 sends information to various destinations 230. Content 155, as explained above, is all the material resident in the computer that was created or brought into the system that has utility for the user, that can be examined or otherwise operated upon.

FIG. 2 also shows the I/O controls including hardware and software for converting electronic signals from the respective I/O devices into data for the HIOS 150 to process and vice-versa. Other than having specific means for each different kind of device to deal with the conversion into data, once converted the HIOS treats all the inputs and outputs alike.

The input handler 205 detects inputs and the HIOS 150 decides their semantic content, based on standard input handling techniques. For example if it finds the pointer, controlled by the output handler 215, coinciding with an object it will direct the output handler 215 to highlight the object in such a way as to signal indication. There need not be any coding techniques that are beyond the ability of one skilled in creating system code, the invention is primarily in the structure of the interface.

Figure 3:
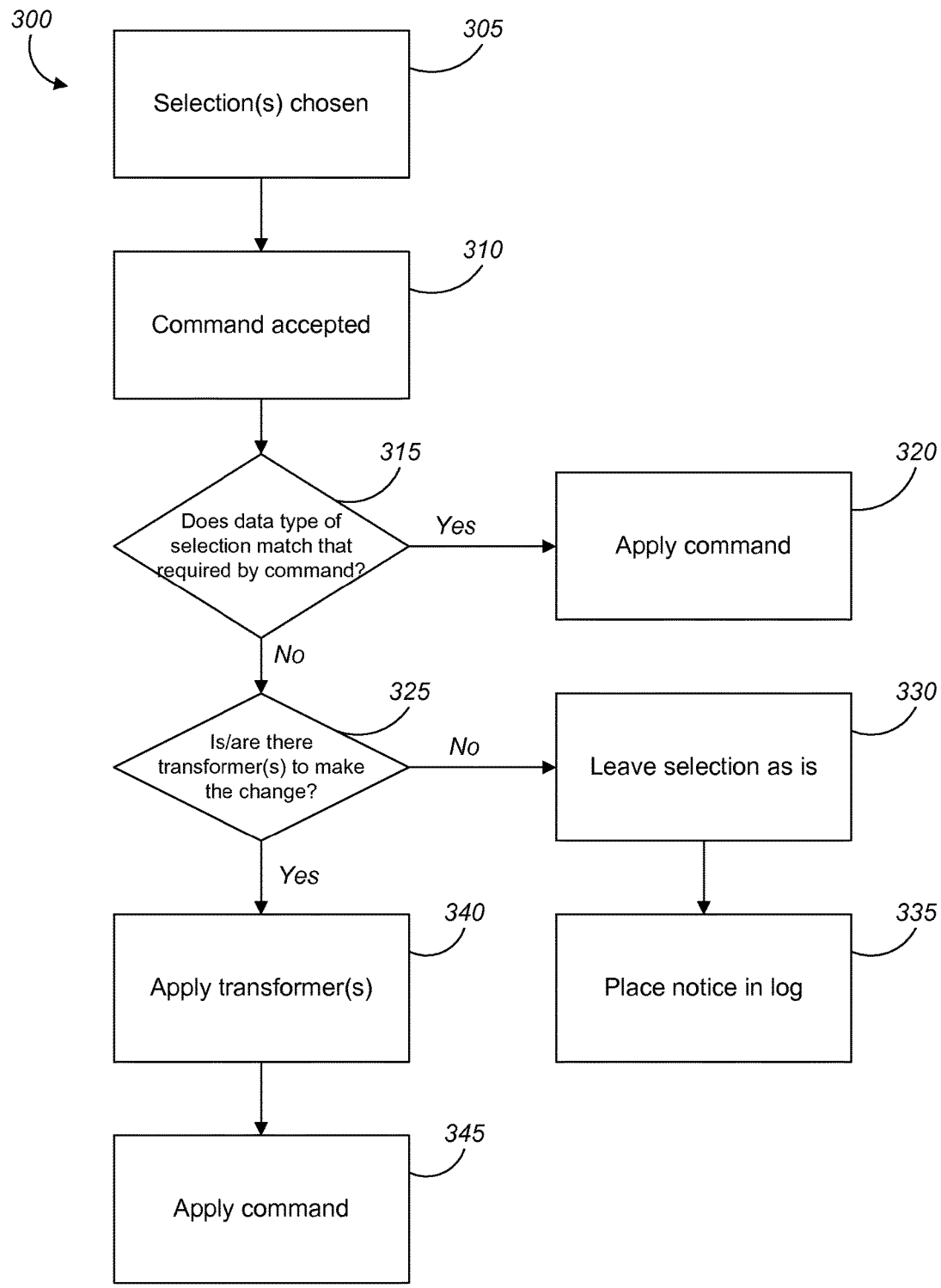
FIG. 3 is a flow chart showing the process of applying a command to a selection in accordance with the invention.

FIG. 3 is a flow chart 300 of the process of applying a command to a selection including the steps of choosing a selection 305 (in accord with noun-verb order), having a command accepted by the HIOS 150 in step 310, the selection and command are compared by HIOS to see if the data type of the selection matches the data type required by the command and makes decision 315. If there is a match, then the command is applied at step 320, giving the commanded result. If there is no match then decision 325 is made depending on whether there is a transformer or a set of transformers available that will convert the data type of the selection to a data type on which the command can operate. If there is not, then step 330 is taken, which leaves the selection unaffected and in step 335 a notice that the command was not carried out because the data was the wrong type is put into the log. Optionally, a message to that effect (in this implementation, it would be a transparent message), is placed on the display. In the event that the result of decision 325 is positive, then the appropriate transformation(s) is (are) applied to the selection in step 340, and then the command is applied at step 345 to the transformed selection.

By including interpreters and/or compilers which can be invoked by commands, the HIOS can serve as its own programming environment. Text can be treated as code, and commands that format the text appropriately for each language can be provided, while most program source manipulation is accomplished by the standard, universal text editing methods and commands already described.

Indication

In accordance with the invention, a system of indication provides a way in the interface to set some portion of the content apart from other content. This is sometimes referred to as highlighting and involves adding, by any means, a recognizable distinction to an object of content. The function of the highlight is to allow the user to determine, by passive observation, that the system has recognized a particular object as having a special status. The semantics of that status are dependent on the nature of the object and on the commands that the user can apply to it. For sighted users, the highlight is usually visual. Examples of visual highlighting mechanisms include brightness reversal, color change, a colored shadow, change of contrast, underlining, blinking or other periodic change, and applying a stationary or animated border to an object. Non-visual highlighting can be provided, for example, in an audible manner by different choice of voices, background sound or quality (such as a buzz or echo) or spoken inflection.

As the user moves the cursor over objects, for example with a GID such as a mouse or by searching as with LEAP, the object to which the cursor currently points is highlighted. In text, the currently selected object typically would be an individual character. Highlighting the single object pointed to as a cursor is moved, without any other user action (such as clicking), is "indication." With indication, the user knows at all times at what object the system thinks the user is pointing. In too many conventional systems, the user must guess at what will be selected or activated when a GID button is pressed, clicked, double-clicked or otherwise. If the user's guess is incorrect, the user will have to try again, wasting time and energy. Indication can be especially valuable when the objects that the user would like to select are small and close together, when they overlap, or when their limits are unclear. One example may be a computer aided design ("CAD") document with many graphic components closely grouped together.

In the preferred implementation, the highlighting used for indication does not exhibit too much contrast to avoid confusion with what is selected and to prevent annoying flickering of objects as the cursor moves over them. Optionally, the system may be configured not to indicate objects when the cursor is moving faster than a threshold velocity. In an alternate implementation it will be beneficial to have high contrast indication. A smaller object (as measured by the visual angle the indicated object subtends), for example, may require higher visual contrast of the indication.

Use of a universally applied system of indication as described can eliminate unnecessary clicking (by comparison with conventional designs). In fact, indication can often replace clicking, and clicking can be used in place of double clicking (as when one follows a link in a HTML browser by means of a single click).

Figure 4:
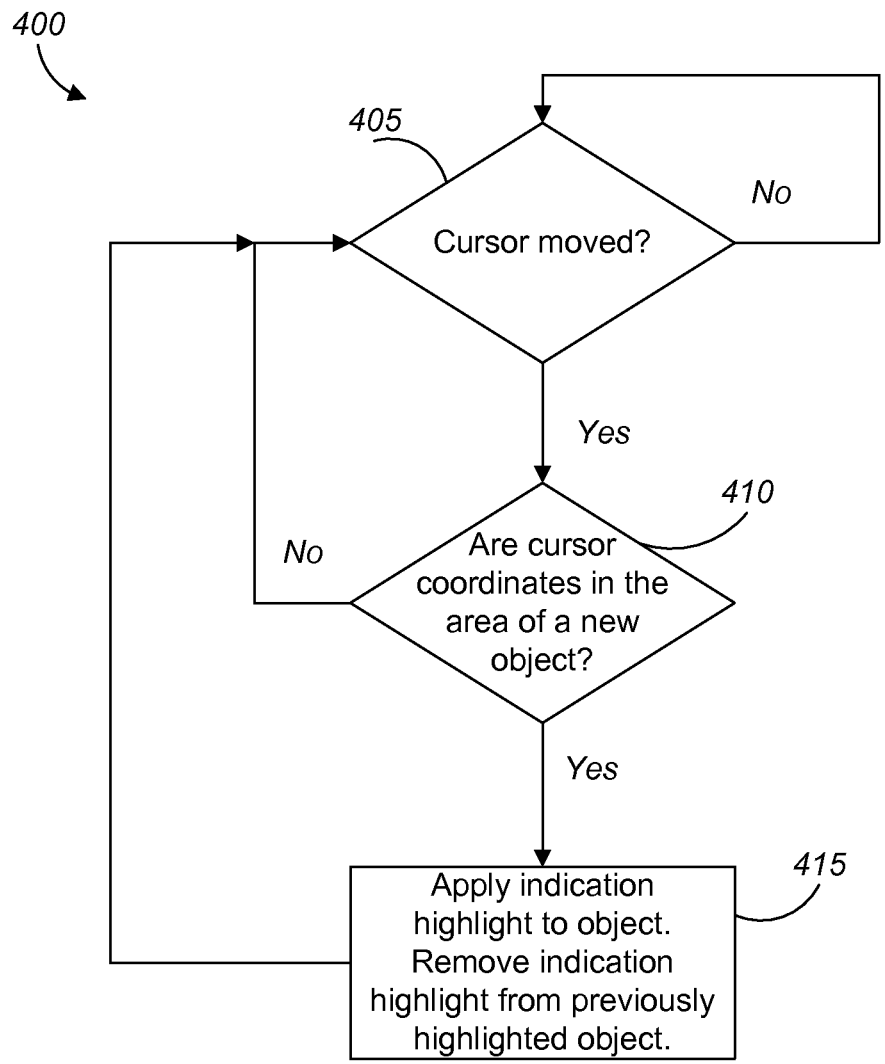
FIG. 4 is a flow chart showing the process of indication in accordance with the invention.

FIG. 4 is a flow chart 400 for indication. While either interrupt-driven or polling methods may be used, a polling method is shown. Decision 405 checks whether the cursor has been moved. Upon its being moved the new location is checked at decision 410 to see if it points to a location associated with a new object (that is, one that is not presently indicated). If not, the process returns to waiting for a cursor move at decision 405. If the cursor is at a location associated with an object, then that object is highlighted as specified in step 415, and any other previously indicated object is not highlighted. Note that if there are multiple objects that overlap, there may be a number of locations in the overlapping area associated with each object so that small moves of the cursor will cause one or the other of the objects to be highlighted.

Figure 7:
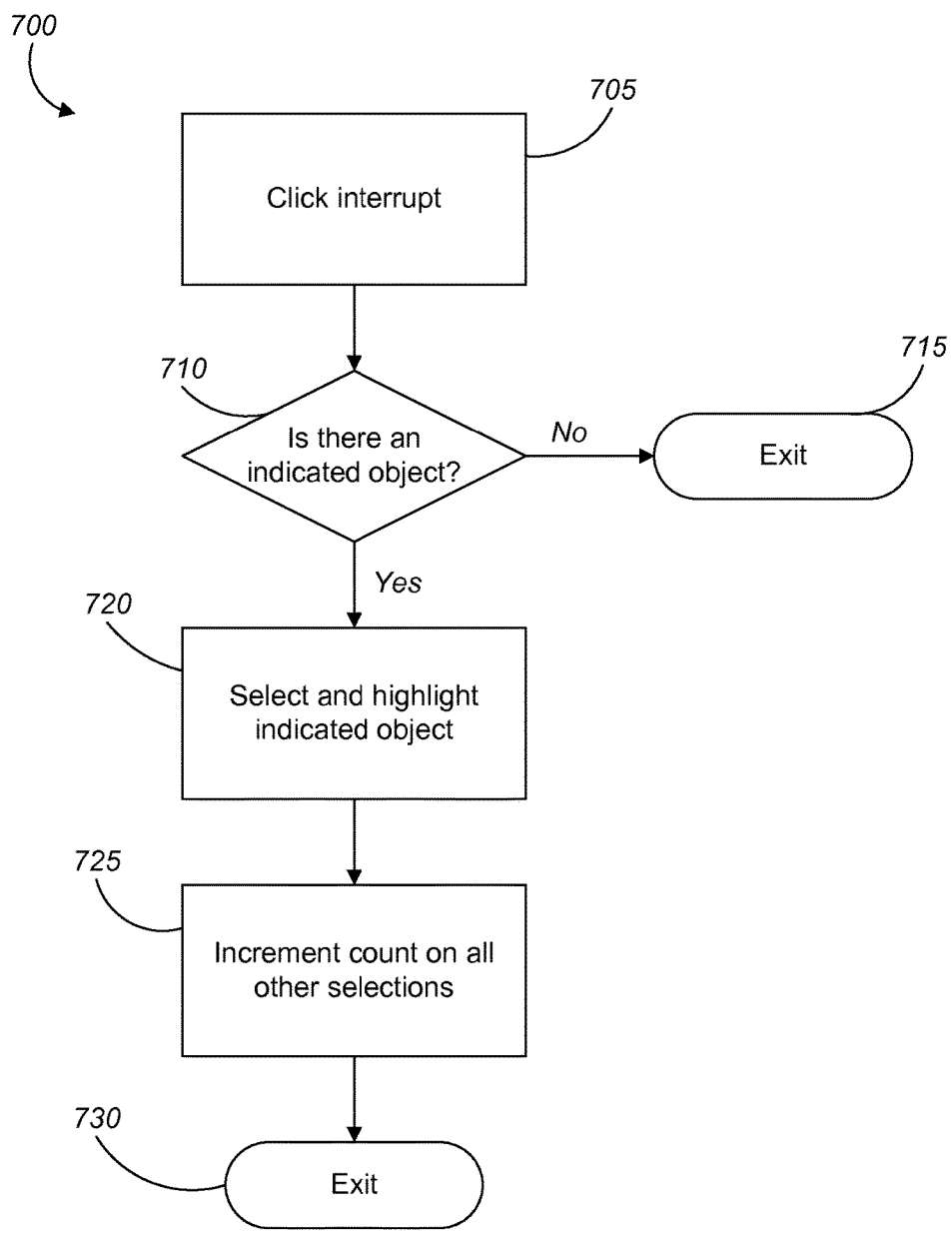
FIG. 7 is a flow chart showing the process of clicking on an object in accordance with the invention.

FIG. 7 shows a process for clicking on an object. When there is a click from the GID, the interrupt is triggered at step 705. The HIOS then checks to see if there is an indicated object 710. If not, the routine exits at 715. If an object is indicated, the indication highlight is changed to a selection highlight and the object is made the current selection 720. Then all other selections have their count incremented 725, that is, the n-th old selection is made the (n+1)-th old selection.

Figure 5:
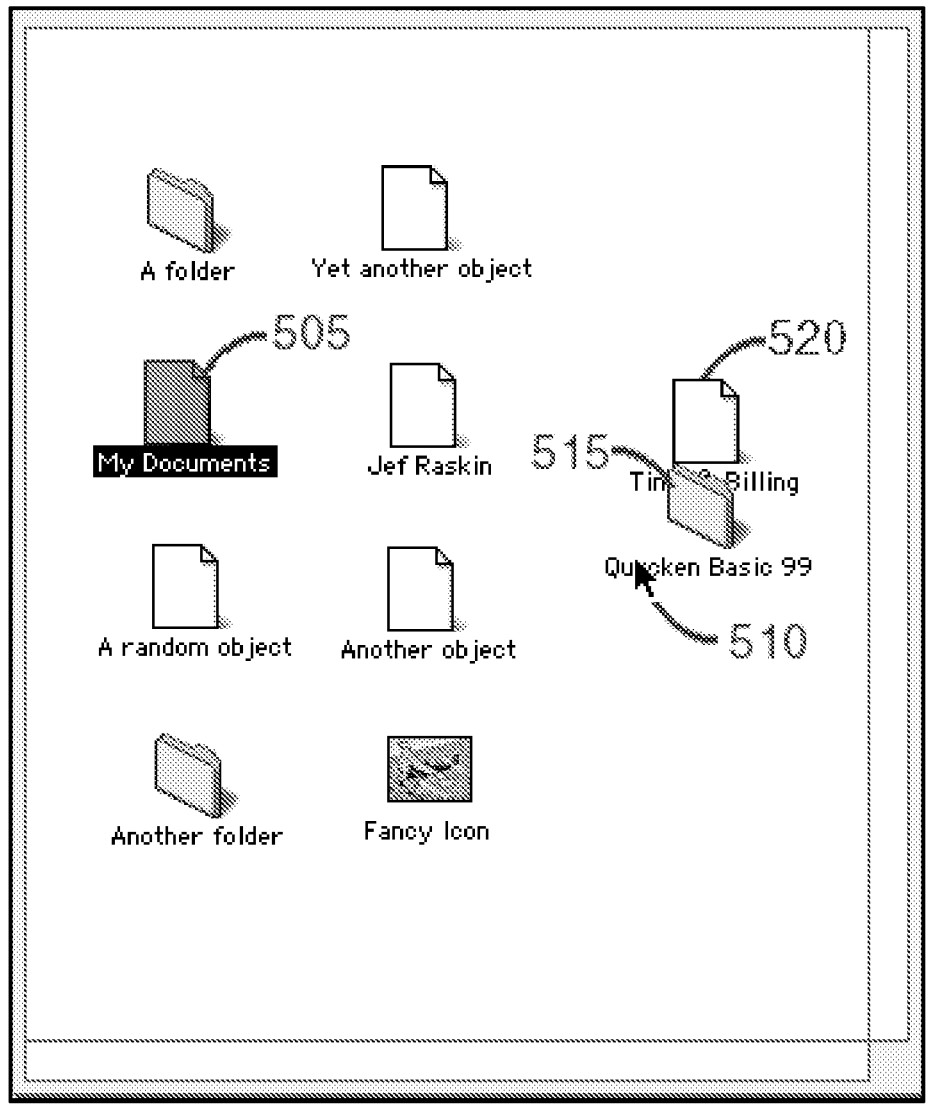
FIG. 5 is a schematic diagram showing highlighting of an icon in a prior art system.

As seen in FIG. 5, representing prior art, the icon for the "My Documents" folder 505 is highlighted, i.e., displayed in inverse as compared to the other icons on the screen, because it has been previously selected by the user. The cursor 510, however, is located in a different portion of the display screen, above the icon for the Quicken Basic 99 application 515, which is itself overlapping and partially obscuring another icon "below" it called Time & Billing 520. As can be seen in the figure, there is no indication of the object to which the interface thinks the user is pointing. Accordingly, if the user performs an operation, for example presses the delete key, it will be the My Documents folder 505 that is affected, and not the Quicken application 515 the user may currently be pointing at with the cursor 510. Because the user's locus of attention is likely on whatever cursor 510 is near, pressing the delete key may have unintended consequences.

Figure 6:
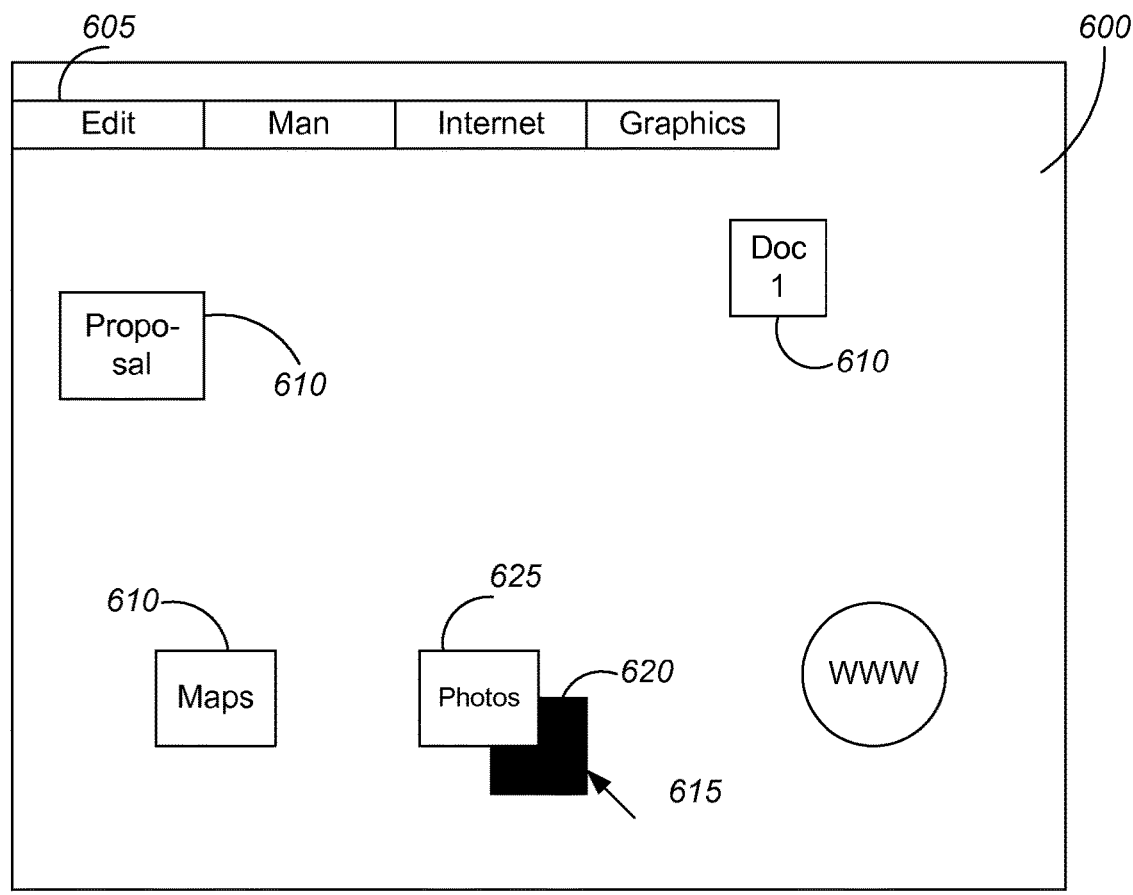
FIG. 6 is a diagram showing one implementation of the HIOS in accordance with the invention.

In contrast, FIG. 6 diagrams one implementation of the invention wherein the system of indication is used in an interface similar to the prior art windows-based GUI. FIG. 6 shows a computer display 600 including a menu bar 605, a number of icon objects 610, and a cursor 615 that is controlled by a GID (not shown). Cursor 615 is shown "pointing" at icon 620 representing a framed area that contains content. In accordance with the invention, the interface indicates that frame 620 is being pointed at by the cursor 615 by highlighting frame 620. As can also be seen, frame 620 is "below" and partially obscured by frame icon 625 named "Photos". Because icon 625 is displayed in the normal manner, the user immediately knows that it is frame 620 that is being pointed at and not 625, even though frame 625 is on top. Thus the user knows exactly what item will be selected or activated when the user clicks the appropriate GID button in the appropriate manner.

Selection Stack

In prior art systems, the previous selection is commonly deselected. In contrast, when a selection is made in the system in accordance with the invention, the previous selection is maintained and becomes the "old" selection. This selection process can be iterated so that as the user creates new selections, the most recent selection becomes the old selection, the next most recent selection becomes the second old selection, and, in general, the nth most recent selection becomes the nth old selection. Placing the selections on the stack and maintaining their order is accomplished automatically as the user makes selections. The only limitation to the size of this selection stack in one implementation can be the amount of available memory. In one implementation of the invention, the highlighting that signals selection is distinct from and more readily apparent than that used for indication (if indication is present). The highlighting for older selections also makes them clearly distinguishable from one another. In one implementation, the highlight of older selections may be of lower visual contrast than newer ones. In another implementation, an alphanumeric designation may accompany old selections so that they can be readily identified. This is especially useful if the number of selections becomes large. In yet another implementation, the selection highlight is animated, such as the "marching ants" or "marquee" style, with the animation moving more slowly the older the selection is. As will be readily understood, some or all of these highlighting implementations may be combined in various combinations and still others will be known or readily conceived of by one of ordinary skill in graphic interface design.

In one implementation, along with this invention's method of selection, are one or more commands for adjusting the stack of selections. These are commands that allow the user, for example, to interchange the current selection with the first old selection, to interchange the current selection with any earlier selection, or to interchange any two old selections or groups of old selections, to deselect any selection.

In the invention, the first problem of existing systems—lack of visibility—has been corrected. Initially, the different highlighting provides immediate visual feedback to the user which makes the behavior of the selection process apparent. The use of a numerical indication of prior selections is also a means for making the selection stack clearly visible to the user. In addition, visibility can also be enhanced by use of an on-screen hint, for example, that further explains the visual highlighting.

Another drawback of prior art systems is the high risk the user runs of making a mistake during the composition process. In one implementation of the invention, an improved method for making complex selections includes a command that redefines the current selection to be the union of the old selection and the current selection. Given such a command, the user can concentrate on making a selection without any concern for what she has done previously; only after she confirms that the current selection is correct does she add it to the composite selection. In one implementation, a command collecting a number of selections greater than two into the current selection can be provided. Making old selections available (and, of course, marked by a special highlight so that they are visible) also allows multi-argument commands—for example, the two arguments to a command that interchanges a pair of selections. Furthermore, most conventional systems do not apply their undo and redo commands to the process of making selections. This omission is unfortunate, because errors in making selections are frequent. An implementation of the invention includes an applicable pair of undo and redo commands that apply to the selection stack, for which the only limitation to the number or levels of undo commands permitted is that due to available storage.

Regarding another drawback, the trouble with toggling (toggles in general are modal and thus introduce the potential for mode errors), a preferred implementation of the invention includes a simple solution: providing one command or quasimode to add an object to the selection stack, and a different command or quasimode to remove an object from the selection stack. Trying to add an object already selected will not change the selection, and trying to remove an object not in the selection also will not change the selection.

In another aspect of the preferred implementation, if the user re-selects the nth old selection, it becomes the current selection. All old selections older than the nth retain their position, but the current selection becomes the first old selection and all other selections newer than the nth move down one position. In one implementation, if the user selects a part of an old selection, or modifies the content of an old selection, then that old selection is deselected (noting that it may be reselected later by use of the UNDO command) and any succeeding selections are moved up one position in the stack.

A selection can also be made in a pure voice system. For example, using a microphone with a rocker switch, as described above, a user can hold the switch and Leap to the spoken pattern "one—period—space—A—N—space—I", release the switch, completing the Leap, and then Leap to "G—colon" completing a second Leap. The user then presses and holds the command key and verbally gives the command "select", which selects a sentence starting with "1. An i . . . ". Similarly, the user can make a second selection. Verbal commands such as "Play selection" and "Play old Selection" and "Play fourth old selection" lets the user check the contents of such selections audibly. A verbal command (as with all commands, spoken while holding the command key in keeping with the modeless virtues of the HIOS) such as "interchange selections" would interchange the current and the old selection, to name one particular operation.

FIG. 7 shows an implementation of the invention. A user focuses on a first object displayed on a monitor by pointing to this object using a GID, e.g., a mouse, and clicks the main button (step 705). If there is an indicated object at that moment (step 710), the system will select the object indicated (step 720). As part of the selection process, the system changes the highlight so as to indicate selection and adjusts the other selections accordingly (step 725). In one implementation, selections are represented internally by a pair of pointers, one to the beginning of the selection and another to its end. Methods of creating highlights and maintaining stacks are well-known to implementers, so that this figure represents not the implementation but the novel behavior of the interface.

Commands

Almost all that a computer does involves the content that the user is given, provides or obtains, and some set of operations performed upon this content. The interface to every such operation consists of two parts: choosing the content as just described and invoking the operation. For example, in a computer game, the user might shoot a monster, or, in other words, perform the operation of changing the image of a monster into an image of an explosion. The content is chosen by moving a cursor to the monster and the operation is invoked by pressing a GID button. In a CAD package the object selected might be a polygon of 7 sides and the operation one that makes it a polygon of 23 sides.

One aspect of the invention relates to methods and apparatus for invoking the desired operation to be performed on selections that have been pre-chosen, as described above, by the user. Another aspect of the invention relates to uniform application of commands regardless of context and the form of the indicated content.

A comparison with prior art systems makes the advantages clear: In the most widely used current a user can transfer a selection from an invisible buffer to the current focus by use of a "Paste" command. The command is variously invoked by either one. Moving the cursor to an "Edit" item on a horizontal menu that is at the top of the display or window, possibly far from the present cursor position, clicking (or clicking and dragging) on the word "Edit" so that a vertical menu appears, and then either dragging down to or clicking on the word "Paste." Alternatively, the user can press and hold a special quasimode key (the command key) and tap the key marked "V". There is no obvious mnemonic connection between the letter "V" and the operation of pasting. Furthermore, not all commands have a keyboard invocation and can only be accessed through menus. In some states of some conventional systems, as when certain menus are unavailable, there may be only keyboard methods for invoking certain commands, and searching through menus becomes futile.

By contrast, the invention makes it possible to put lists of commands anywhere and to use them as though they were a menu; at the same time it automatically guarantees that there is always a keyboard shortcut and that the shortcut has the same spelling as the command when in menu form. Thus it is at least as good and often better than conventional art for beginners who tend to use menus, it makes it far easier than conventional art for a user to transition from menu to command operation, and it is more efficient than traditional command-line commands because the commands can be issued anywhere and at any time rather than just on the command line and only when such a line is available.

For example, say that the spelling of the command to evaluate an arithmetic expression is "calc" and say that the user has typed the following text into a system configured according to the invention, "I want to buy 17+24+18+19+21 shirts for our 5 soccer teams." and he wants to find the total number of shirts he must order.

The user next selects the text "17+24+18+19+21" and, while holding the command key, types "calc" whereupon the text becomes "I want to buy 99 shirts for our 5 soccer teams."

In one implementation, as the user typed the word "calc", it appeared in a transparent message box on the display so that the user can verify her typing; the box would vanish when the command key was released. In alternative implementations, the message might appear only after some number, such as four, characters have been typed, or it might appear in a conventional dialog box or in some special position on the display.

Where the "99" is now the current selection. Alternatively the user could have typed "calc" into the text, selected it, and tapped the command key. Because the command requires an argument, and because the command is the current selection, the old selection is used as the argument. In this implementation, the command itself is deleted, and the result of the evaluation is left selected. This results in the same display as before. Yet another alternative is where there is an instance of the string "calc" somewhere on the display such that the term has been marked, for example by being grouped, as a command or potential command and instead of typing calc, the user selects the command by making sure that it is indicated, and then tapping the command key. If what is indicated is not a command, there is no effect on the selection. In the preferred implementation a note would be entered into a message log, and a transparent error message that is not modal would appear on the display. The document need not be limited to a bald list of commands. For example, each command can be accompanied by a description, or even the user's own notes. A document that is used as a menu in the invention s an ordinary text document, not something that can be changed only by programmers or by using a special customization facility.

Before invoking the calculate command, the arithmetic expression was ordinary text. Except that it was selected, there was nothing unique about it; the characters (including spaces) of which the selection was composed could have been deleted or moved, or other typical word-processing commands could have been applied to it (using the same manner of input). But in this case, the operation that was applied was calculate. There was no need for the user to open a calculator window or to invoke a calculator application, making this invention easier to use than most prior art systems.

In this manner, commands need not be restricted to supplied menus, but can be part of the user's text or, where appropriate, the command can be a graphic object instead of a word or set of words. Commands can therefore be provided by the user in a simple manner, by merely typing (or drawing) them anywhere. This use does not conflict with the method in which the command is selected from pre-existing text as they are both content, not system-level widgets.

As a user can lock a selection so that it cannot be changed, a menu provided by a software developer which is locked is not an exception to its being ordinary content.

To facilitate ease of user recognition, commands can optionally be shown with some special marking—reverse italics, for instance. In an alternate implementation, the user would point to a command name so that some letter in the command is indicated, whereupon a tap of the command key would invoke the command. This eliminates the step of having to select or type the command name in invoking a command.

Because it would waste time and display space to designate a special location for typing commands, the invention allows a command to be typed wherever the cursor happens to be at the moment the need for the command becomes apparent. The typed command name is deleted after being executed, so that command names are not left scattered among the user's content. On the other hand, when the user executes a command from a list of commands, the command does not disappear; in effect, the list is a menu. As was described above, this can be done by grouping each word that is to be a command and by locking the list. To create a special, visually or audibly distinguished menus, a command (perhaps called "make menu") that can change them to a distinctive style typically used only for commands could be created.

The operation of the invention can also be described in the context of electronic mail. With the invention, an e-mail directory is simply a user's address list, or any list containing names and e-mail addresses. It is just ordinary text, not a special mechanism. If the user wants to send an e-mail to his uncle Herman, the user types the text of the message and selects it. The user then moves to the appropriate, mailing list item ("Herman Jackson" for example) and selects Herman's e-mail address. Lastly the user issues "Send" command by any of the means described. Another implementation of the e-mail function is to have an e-mail send command automatically use the first line of the selection as an address, the second line as the subject heading, and the remainder as the content of the message. A different command may also be provided for making a selection an attachment to an e-mail message.

The invention is also useful for providing instant access to help information from anywhere in the system. The user simply would have to execute the command "help". An inverse property is also true; that is, help text can also provide the user with the appropriate commands within it making them available for immediate execution.

Figure 8:
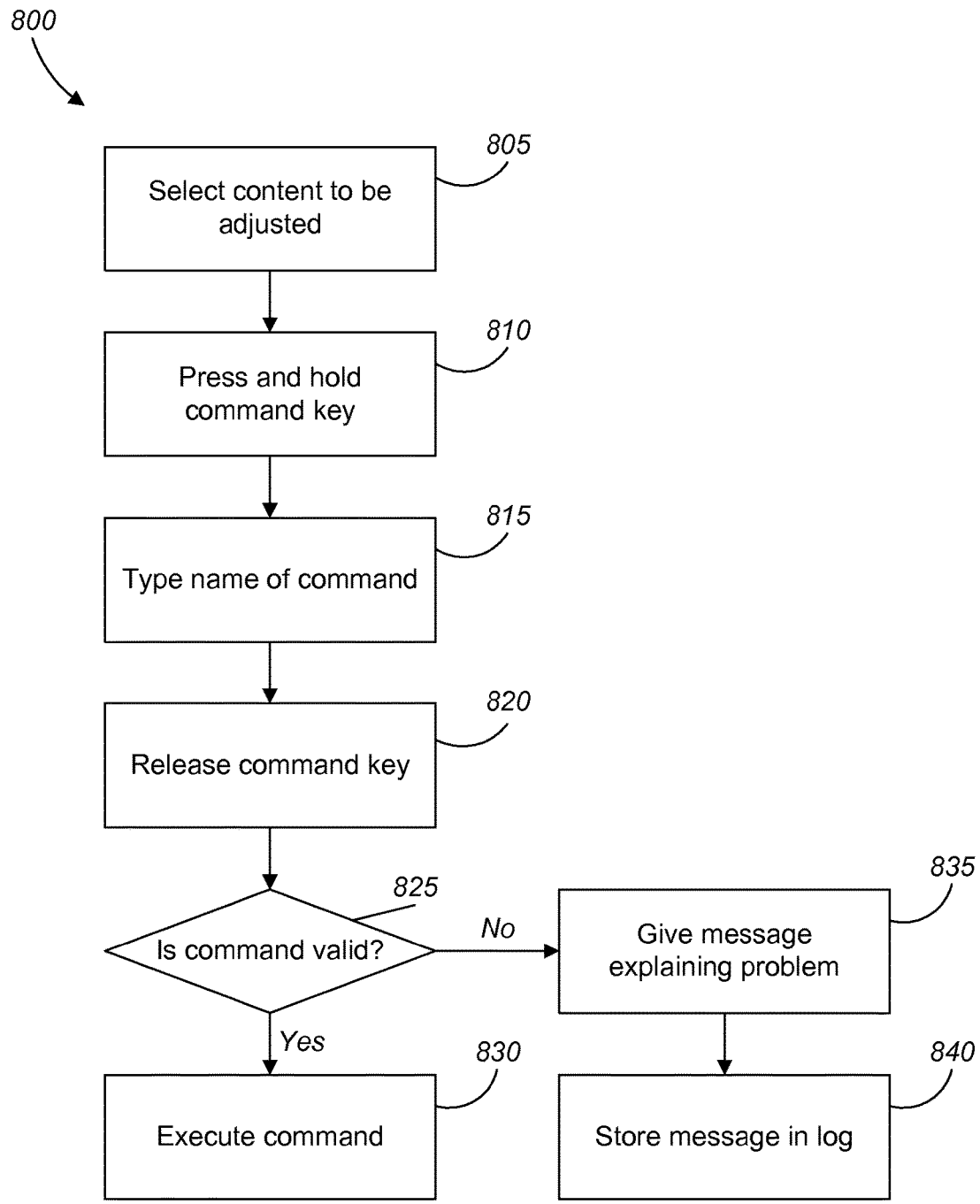
FIG. 8 is a flow chart showing how a command is applied in accordance with the invention

FIG. 8 is a flow chart 800 for commando execution in accordance with one implementation of the invention. A user decides to change some aspect of the content by means of a command. The user selects the desired content 805 by selection methods previously described, presses and holds down the command key in step 810 and continues to hold it until step 820. While holding the key, the user types the name of the command in step 815, and then releases the command key in step 820. The HIOS checks for command validity, matches data types if necessary as shown in FIG. 3, and if there is no problem in step 825, continues with step 830 and executes the command. If there is a problem discovered in step 825, an appropriate message is given in step 835, the message is stored in a message log in step 840, and the process is complete.

Transformers

When a command is invoked on a selection, there are three possible conditions: (1) the operation can be performed on the selection; (2) it makes no sense to apply that operation to the selection; or (3) the selection can be modified to make the operation possible. In the first case, the operation is performed and the content modified. In the second case, the content is left unchanged. In the third case, before the command can be performed, another process must be invoked by the computer to modify the selection.

For example, the user selects a part of a photograph of a city street scene and attempts to apply the command that checks spelling. The command expects a sequence of characters (text), but what it finds is a photograph (typically in the form of a bit map or some format such as JPEG which can be rendered into a bitmap). Among the capabilities that the computer has is the ability to transform content from one data type to another. A system component or process that converts content from one data type (or format) to another data type is referred to as a "transformer." Transformers 210 are part of the HIOS as shown in FIG. 2. In this case, the data type is bit map and the command expects text, so the computer sees if there is any transformer that has bit maps as inputs and text as output, shown as step 93 in FIG. 3. There are such transformers available commercially; one example is called an optical character recognition (OCR) program. OCR programs are usually employed to convert input from scanners into editable text. In accordance with the invention, assuming that one is available on the system of FIG. 3, an OCR program is automatically invoked, and it inspects the bitmap. If it finds some characters it recognizes (for example, a stop sign and a partly obscured sign with the characters "North First Stree"), then these texts are presented to the spelling checker, which reports finding one unknown word (stree) and suggests that perhaps tree, strew, or street was meant. If the user intended to correct the spelling of the word "street," he can do so and after the command is completed, the system will automatically transform the modified content back to its original format.

The invention views all software as sets of commands, some of which are transformers that can be invoked automatically when the data type expected by the command does not match the data type of the object selected. More than one transformer may have to be invoked. For example, given a computer with one transformer that converts A to B and another that converts B to C, and if the command expects data type C but the data type of the selection is A, then both transformers will have to be applied before the command can be carried out. And, in the case where there are no transformers available to do the job, no change is made to the selection; the user is informed if necessary, and the selection is left unmodified. In this manner, the user may invoke any command on any content, regardless of context, and the system will automatically provide the correct action wherever such action is possible given the set of commands resident in the system. In some cases, it may not be possible to complete an inverse transform on the result, for example if the nature of the command itself changes the argument so much that the inverse transform is no longer possible. In that case the system may return the result in the transformed state. In another implementation, the system may abort the command and return the system back to its prior state.

In any of the above implementations, commands can be provided that allow a user to apply a transformer to a selection outside of the automatic process.

Transparent Messages

Figure 9:
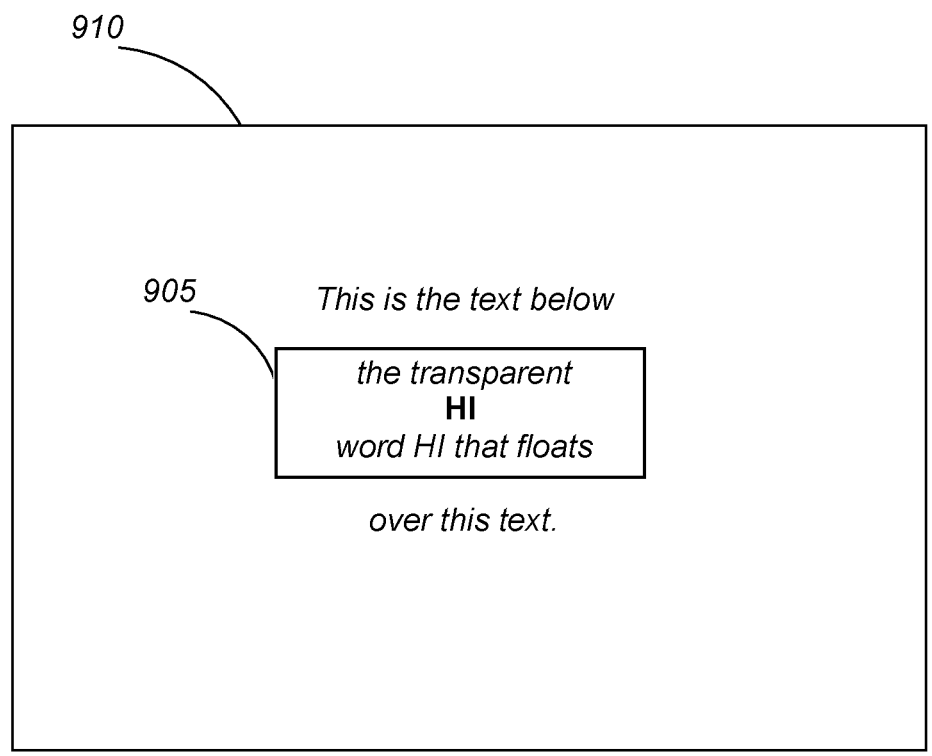
FIG. 9 is a diagram showing a transparent letters over an opaque text in accordance with the invention.

The full visual effect of transparency, especially as it can make good use of color and shading effects is difficult to show in an official patent office drawing style, but FIG. 9 simulates transparent letters 905 representing the greeting "HI" over an opaque text 910. Of course, any graphic or text can be rendered apparently transparent by techniques commercially available. If it were desired to do so, a standard rectangular message box could be displayed in transparent fashion.

A user can point to and select any letter in text 910 by disregarding the transparent overlay. In the preferred implementation the overlay 905 cannot be selected, however by the methods described above, for selecting overlapping objects, an alternate implementation could permit such selection. Once a letter or any portion of the text 910 is selected, it can be operated upon by any pertinent command as usual. In other words, the presence of the overlay does not affect the user's ability to work on material under a message. This is in contrast to prior art error messages which do not allow the user to work, or even see, the underlying content.

Furthermore, prior art error messages often require a response from the user before they are removed by the system. This makes the system temporarily unusable, which is a mode, leading to mode errors and frustration until the user discovers that the message must be dismissed and the user does so.

After a transparent error message has been displayed, as in FIG. 8, step 835, it can remain until the user takes any action, until the user takes some specific action such as modifying the content, it can gradually fade away, roll up like a window shade and then vanish, or be removed any number of other graphical variations, with or without accompanying sound effects. In the preferred implementation any message convened by the transparent message is stored in a message log so that it can be referred to at a future time, as shown in FIG. 8, step 840.

If a message requires a response that requires visual feedback, the feedback can be in the form of transparent objects, which in the preferred implementation may be material typed into a reply area; the typing in this case would be transparent. If a displayed button is to be used, it cannot be transparent if it overlays content that could be selected through it. Thus a button in an alternate implementation would be opaque if it correctly indicated its function. Proficient designers, however, will generally find ways to avoid having messages that require any kind of response.

Spiral Searching

Prior art searching uses different search techniques depending on what domain is being searched. For example, the Find command in a word processor cannot find matching material on the local hardware (such as memory and mass storage devices) or even in word processor documents other than the one from which the Find was launched. In some systems, a separate facility with a different interface can search local mass storage. Yet other facilities with yet other interfaces are provided for searching local and wide area networks, and still another facility with yet another interface can be used to search the Internet.

The invention is a single interface that unifies all these searches. In the preferred implementation, an incremental text search, already described, is the interface.

Generally, prior art searches proceed linearly through their domain. However, a user is far more likely to be interested in the particular task at hand than in some remote web site. Similarly, material within the user's system is more likely to be relevant than the vast hundreds of millions (soon to be multiple billions) of web pages that can be reached by the Internet. Therefore, unlike conventional searches, the invention of a spiral search automatically proceeds from a starting point in a local search domain, for example, a document being edited, which may not be at the beginning of the search domain, to the end of that search domain. Then, the search returns to the beginning of the search domain and then proceeds to the starting point.

If the user has not found the desired text (either because a target matching the pattern was not found in the initial search domain or that the targets that were found in the initial search domain were not what the user was looking for), then the search proceeds to a second, larger domain that includes the first search domain. The search proceeds circularly in the second search domain, searching from the end of the initial search domain to the end of the second search domain. Then, the search returns to beginning of the second search domain and proceeds to the beginning of the first search domain.

If the user has still not found the desired text, then the search proceeds to a third, larger search domain that includes the first and second search domains. The search proceeds circularly in the third search domain, searching from the end of the second search domain to the end of the third search domain. The search then returns to the start of the third search domain and proceeds to the start of the second search domain. The search spirals through ever expanding search domains until the user locates the desired text or otherwise terminates the search. Note that the search interface is identical, and that the search can be continuous, for example using the mechanism and interface of the aforementioned LEAP patent, and in particular resuming searching by means of a "LEAP again" construct as taught in that patent, or via another means.

Figure 10:
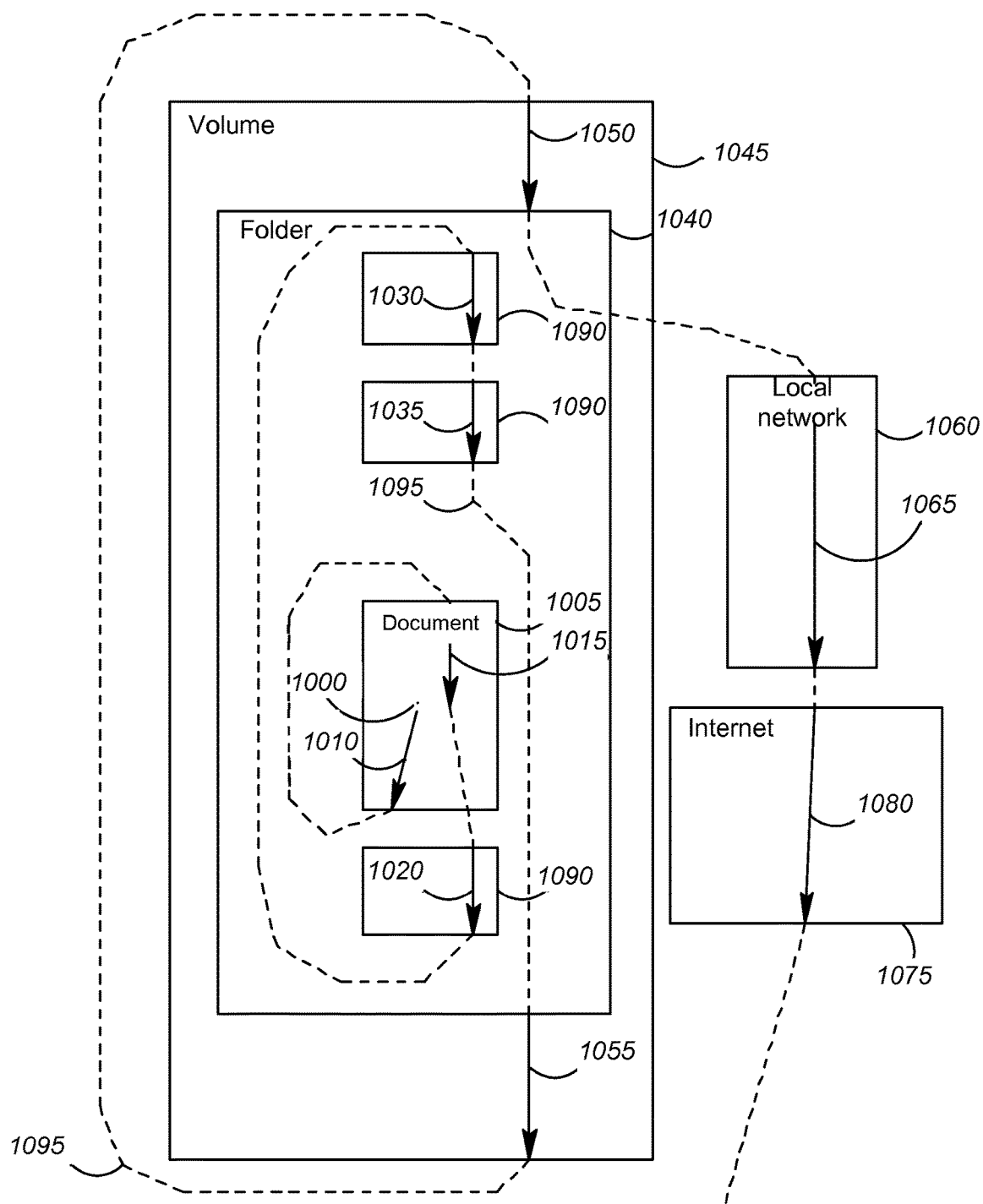
FIG. 10 is a flow chart showing a spiral search process in accordance with the invention.

For example, as shown in FIG. 10, the first search domain where the user's current focus 1000 is shown in a document 1005 (also referred to as a "file") stored on a user's local computer (not shown). After searching the document as shown by arrows 1010 and then 1015, the search can proceed to search other documents 1090 along a path schematically indicated by arrows 1020, 1030, and 1035 located in a collection of documents that might be collectively thought of as a folder 1040 stored on the user's local computer that contains the first document 1005. After searching the folder 1040, the search can proceed to search other documents located in, for example, a volume 1045 (also referred to as a "drive" or "file system") local to the user's computer that contains the folder 1040 and other folders (not shown), but the search proceeds through them as shown by arrows 1050 and 1055. After searching the volume 1045, the search might proceed to other documents (which may be located in other folders) located on other volumes (not shown) that can be accessed over a local area network 1060 as shown schematically by arrow 1065. The dotted lines 1095 (not all numbered) between the arrows show the spiral nature of the search. After searching the local area network 1060, as shown schematically by arrow 1065, the search can proceed to search other documents stored on other volumes eventually reaching, if desired, the Internet 1075 which is searched as shown schematically by arrow 1080.

While the arrows are shown as linear, the search method may be based on binary search, hashed search, indexed search, or any other method that is intended to find all instances of the search pattern in the domain. The user may stop the search at any time. If LEAP is used, this is done by releasing the quasimodal LEAP key. With other search interfaces, well-known means, such as a "cancel" button on the display, can be used.

Should the user be aware that some other domain is likely to be more favorable to the search, there is nothing in this invention to prevent the user from using a conventional link (also called a hyperlink, sometimes implemented as a "URL" such as "www.jefraskin.com"), or to move the system focus to that domain and to start searching there.

Since matching patterns are displayed, and in the preferred implementation are displayed in context, as they are found during the search, the user can tell when he or she has typed enough of a search pattern to disambiguate the desired instance. Thus, as soon as the user sees the desired text has been located, the user can stop entering the pattern and terminate the search. If the user happens to type a few too many letters of the pattern (in the case where the user types quicker than the search), the pattern will still match and the cursor will stay where the user wanted it. Also, preferably, the user can backspace at any time—for example, if the user happens to mistype a character in the search pattern—and be returned to the last match found Searching can be implemented using LEAP. In such an implementation, one LEAP key is used to invoke the search process in a forward direction and the other LEAP key is used to invoke the search process in a backwards direction. Pressing and holding either of the LEAP keys, puts the system into a quasimode in which the user can enter the characters of the search pattern. The search of FIG. 10 proceeds in an incremental fashion, with the system searching expanding search domains as necessary. If an instance of the current search string is found, the user can instruct the system to search for the next occurrence of the current search pattern, for example, by tapping a LEAP Again key if such is available, or any key that has been designated to have that function.

In other implementations, the searching scheme of FIG. 10 can be implemented using delimited searching. In such an implementation, the user would specify the entire search pattern before the searching is initiated.

Spiral searching can be implemented using voice control technology. For example, a microphone can be provided having a switch, such as a rocker switch that can be set to one position to initiate a forward search and to a second position to initiate a backwards search.

After the user speaks a character of the search pattern, the character is added to the current search pattern and a search of the current search domain is initiated. Alternatively, the search can be initiated after user has spoken an entire search pattern. Whenever a matching target is located, the matching target can be displayed and/or audibly indicated to user (for example, by having the system say the sentence in which the target was found).

An expanding spiral process can also be used to search the World Wide Web using conventional organizational strategies. For example, a user can initiate a search that proceeds circularly through an initial web site. Then, the search proceeds to search related web sites (for example, as defined by a web-categorizing service such as YAHOO!® or GOOGLE®) until the search has searched the user's own machine and the entire largest network to which the user is attached.

Figure 11:
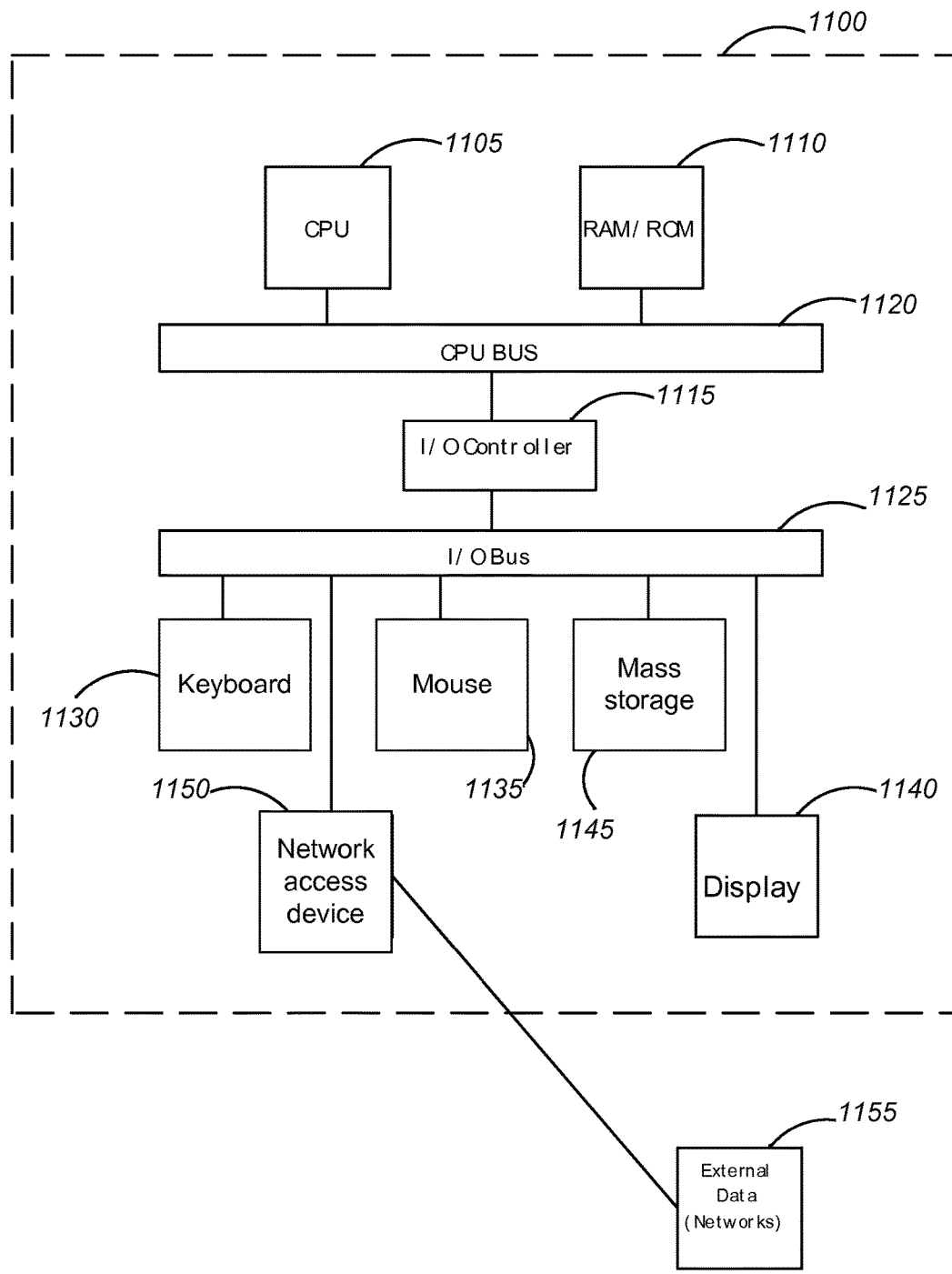
FIG. 11 is a schematic diagram showing a programmable processing system the HIOS in accordance with the invention may be implemented.

FIG. 11 illustrates one programmable processing system 1100 on which the invention may be implemented, including a CPU 1105, a RAM 1110, and an I/O controller 1115 coupled by a CPU bus 1120. The I/O controller 1115 is also coupled by an I/O bus 115 to input devices such as a keyboard 1130 and mouse or other graphical input device 1135, and output devices such as a display 1140, to mass storage 1145, and to a network access device 1150 such as an Ethernet card which in turn is connected to sources of external data 1155 which may be on various networks.

Graphic Input Device

Figure 12:
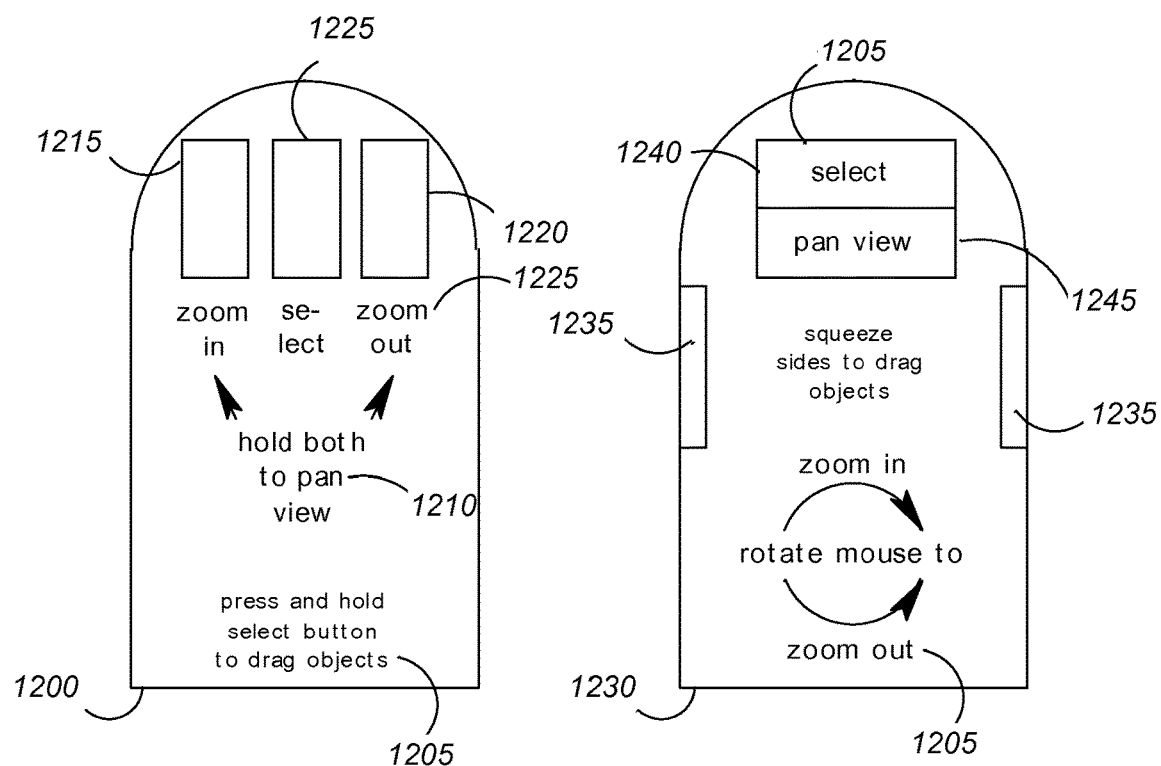
FIG. 12 is a schematic view of two implementations of a graphic input device in accordance with the invention.

FIG. 12 illustrates two implementations of an interface to a graphic input device, the well-known mouse that represents an improvement over the conventional mouse for the purpose of the present invention. Mouse 1200 is a conventional three-button mouse with labels 1205, 1210, and others (unnumbered), which may appear on the body of the GID or on the buttons or other moveable parts, to show the functions of the buttons. In this implementation, the left button 1215, when pressed, starts zooming in, which makes objects in a display appear larger but which shows an increasingly smaller area of the objects. Zooming stops when button 1215 is released. Similarly, button 1220 controls zooming out, which is the opposite function to zooming in. If both buttons 1215 and 1220 are pressed and held, and the mouse moved, it will cause the entire view to move in parallel with the cursor that is moved by the mouse, potentially bringing new objects into view, as indicated by label 1210. Button 1225, when tapped, is used to cause objects to be selected. Button 1225, if pressed and held while mouse 1200 is moved, will cause any object pointed to be dragged to a new position. Prior art mouse designs do not incorporate labeling, which makes learning how to use them more difficult and which tends to permit different and conflicting uses of the buttons. Labels help make an interface more consistent and aids in creating desirable monotony.

FIG. 12 also illustrates an embodiment of a graphic input device, in this example a mouse 1230, in which rotation of the mouse clockwise causes zooming in as described above, and rotation counterclockwise causes zooming out. It is clear that this could be accomplished by other GIDs that have the ability to signal rotation on a primarily vertical axis, such as rotation about the vertical axis of the handle of a joystick. Labels 1205 make learning easier and help restrict the creation of non-monotonous uses of the mouse functions. Grabbing displayed objects is made to simulate grabbing physical objects by placing sensors or buttons 1235 on the sides of mouse 1200. This provides a natural mapping from normal hand motion to the grab-and-move function of the HIOS. Button 1240 is used to select, as described above, and button 1245 is held to pan the entire contents of the display as described above.

These implementations of a portion of the invention support the HIOS principles of visibility and monotony and correct a number of problems that have existed since the very first mouse was designed. Another problem the present invention solves is that the buttons now have distinctive names, making them easier to refer to in manuals and in spoken discourse, especially for those who have that form of dyslexia which confuses "right" and "left".

Software Implementation

The invention can be implemented primarily as software, to run on any hardware device that has sufficient resources for the implementation and appropriate inputs and outputs. By means and a process long known to those skilled in the arts of algorithmic design and programming in machine language, assembly language, and/or higher level languages, this invention can, from this description of its desired behavior, be made to operate on almost any of a wide range of existing and future hardware platforms such as digital computers, information appliances, network terminals, wireless phones, personal digital assistants, and other like devices. By these means and by that process, it can be adapted to various circumstances, integrated with existing and planned software and data structures, and implemented so as to run locally (whether installed from an internal hardware device or downloaded from a network or external hardware device) or remotely (where the software is executed at a distance from the user's hardware device).

Hardware Implementation

The software portions of this invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. For example, the operations identified in each of the processes can be performed in a different order. Also, circular expanding searching can be implemented using delimited searching and/or incremental searching. Accordingly, other implementations are within the scope of the following claims.

What is claimed is:

1. A method performed by an information appliance, the method comprising:
    receiving a verb-text input from a user and displaying the received verb-text in a user interface of the information appliance, wherein the information appliance is operable to invoke a plurality of commands in response to receiving command input from the user, and wherein receiving the verb-text input is not associated with any of the plurality of commands;
    receiving a user input selecting a portion of the displayed verb-text;
    after receiving the user input selecting the portion of the displayed verb-text, receiving a command input from the user that designates the displayed verb-text input as being command text;
    after receiving the command input, selecting a first command from the plurality of commands according to the command text;
    receiving a noun-text input from the user and displaying the received noun-text in the user interface, wherein receiving the noun-text input is not associated with any of the plurality of commands; and
    invoking the first command, wherein the first command uses the displayed noun-text as an operand.

2. The method of claim 1, further comprising:
    after receiving the command input and before invoking the first command, receiving an input from the user identifying the displayed noun-text.

3. The method of claim 2, wherein the command input is a tap of a command key by the user, and wherein the command key is a designated control that, when tapped by a user, indicates that a current selection of displayed text is to be interpreted by the information appliance as command input.

4. The method of claim 1, further comprising:
    receiving an input from the user activating a command quasimode;
    receiving the verb-text input from the user while the command quasimode is activated; and
    selecting the first command after receiving an input from the user deactivating the command quasimode.

5. The method of claim 4, wherein a command quasimode is defined by the user activating and holding a control that indicates that other input submitted by the user while the control is held is to be interpreted by the information appliance as command input.

6. The method of claim 4, wherein the user input activating the command quasimode is a press of a command key by the user and the user input deactivating the command quasimode is a release of the command key by the user.

7. The method of claim 4, further comprising:
displaying the verb-text input in a transparent message box in the user interface while the command quasimode is activated.

8. The method of claim 1, further comprising:
deleting the displayed verb-text after invoking the first command.

9. An information appliance apparatus comprising:
one or more processors and one or more storage devices storing instructions that when executed by the one or more processors cause the one or more processors to perform operations comprising:
receiving a verb-text input from a user and displaying the received verb-text in a user interface of the information appliance apparatus, wherein the information appliance apparatus is operable to invoke a plurality of commands in response to receiving command input from the user, and wherein receiving the verb-text input is not associated with any of the plurality of commands;
receiving a user input selecting a portion of the displayed verb-text;
after receiving the user input selecting the portion of the displayed verb-text, receiving a command input from the user that designates the displayed verb-text input as being command text;
after receiving the command input, selecting a first command from the plurality of commands according to the command text;
receiving a noun-text input from the user and displaying the received noun-text in the user interface, wherein receiving the noun-text input is not associated with any of the plurality of commands; and
invoking the first command, wherein the first command uses the displayed noun-text as an operand.

10. The information appliance apparatus of claim 9, the operations further comprising:
after receiving the command input and before invoking the first command, receiving an input from the user identifying the displayed noun-text.

11. The information appliance apparatus of claim 10, wherein the command input is a tap of a command key by the user, and wherein the command key is a designated control that, when tapped by a user, indicates that a current selection of displayed text is to be interpreted by the information appliance as command input.

12. The information appliance apparatus of claim 9, the operations further comprising:
receiving an input from the user activating a command quasimode;
receiving the verb-text input from the user while the command quasimode is activated; and
selecting the first command after receiving an input from the user deactivating the command quasimode.

13. The information appliance apparatus of claim 12, wherein a command quasimode is defined by the user activating and holding a control that indicates that other input submitted by the user while the control is held is to be interpreted by the information appliance as command input.

14. The information appliance apparatus of claim 12, wherein the user input activating the command quasimode is a press of a command key by the user and the user input deactivating the command quasimode is a release of the command key by the user.

15. A computer storage medium encoded with a computer program, the program comprising instructions that when executed by an information appliance cause the information appliance to perform operations comprising:
receiving a verb-text input from a user and displaying the received verb-text in a user interface of the information appliance, wherein the information appliance is operable to invoke a plurality of commands in response to receiving command input from the user, and wherein receiving the verb-text input is not associated with any of the plurality of commands;
receiving a user input selecting a portion of the displayed verb-text;
after receiving the user input selecting the portion of the displayed verb-text, receiving a command input from the user that designates the displayed verb-text input as being command text;
after receiving the command input, selecting a first command from the plurality of commands according to the command text;
receiving a noun-text input from the user and displaying the received noun-text in the user interface, wherein receiving the noun-text input is not associated with any of the plurality of commands; and
invoking the first command, wherein the first command uses the displayed noun-text as an operand.

16. The computer storage medium of claim 15, the operations further comprising:
after receiving the command input and before invoking the first command, receiving an input from the user identifying the displayed noun-text.

17. The computer storage medium of claim 16, wherein the command input is a tap of a command key by the user, and wherein the command key is a designated control that, when tapped by a user, indicates that a current selection of displayed text is to be interpreted by the information appliance as command input.

18. The computer storage medium of claim 15, the operations further comprising:
receiving an input from the user activating a command quasimode;
receiving the verb-text input from the user while the command quasimode is activated; and
selecting the first command after receiving an input from the user deactivating the command quasimode.

19. The computer storage medium of claim 18, wherein a command quasimode is defined by the user activating and holding a control that indicates that other input submitted by the user while the control is held is to be interpreted by the information appliance as command input.

20. The computer storage medium of claim 18, wherein the user input activating the command quasimode is a press of a command key by the user and the user input deactivating the command quasimode is a release of the command key by the user.

* * * * *